(12) United States Patent
McCann

(10) Patent No.: US 10,084,755 B2
(45) Date of Patent: Sep. 25, 2018

(54) METHODS, SYSTEMS, AND COMPUTER READABLE MEDIA FOR REMOTE AUTHENTICATION DIAL IN USER SERVICE (RADIUS) PROXY AND DIAMETER AGENT ADDRESS RESOLUTION

(71) Applicant: Oracle International Corporation, Redwood Shores, CA (US)

(72) Inventor: Thomas Matthew McCann, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 141 days.

(21) Appl. No.: 14/929,283

(22) Filed: Oct. 31, 2015

(65) Prior Publication Data

US 2017/0048202 A1    Feb. 16, 2017

Related U.S. Application Data

(63) Continuation-in-part of application No. 14/827,015, filed on Aug. 14, 2015, now Pat. No. 9,668,134, and
(Continued)

(51) Int. Cl.
*G06F 7/04*       (2006.01)
*G06F 15/16*      (2006.01)
(Continued)

(52) U.S. Cl.
CPC ........ *H04L 63/0281* (2013.01); *H04L 61/103* (2013.01); *H04L 63/0892* (2013.01);
(Continued)

(58) Field of Classification Search
CPC .......................... H04L 63/281; H04L 63/0281
See application file for complete search history.

(56) References Cited

U.S. PATENT DOCUMENTS 1,872,857 A    4/1931    Wesson et al.
5,878,347 A    3/1999    Joensuu et al.
(Continued)

FOREIGN PATENT DOCUMENTS

CN    1809072 A      7/2006
CN    101001440 A    7/2007
(Continued)

OTHER PUBLICATIONS

Commonly-assigned, co-pending U.S. Appl. No. 14/928,669 for "Methods, Systems, and Computer Readable Media for Remote Authentication Dial in User Service (RADIUS) Message Loop Detection and Mitigation," (Unpublished, filed Oct. 30, 2015).
(Continued)

*Primary Examiner* — Ashokkumar B Patel
*Assistant Examiner* — Vu V Tran
(74) *Attorney, Agent, or Firm* — Jenkins, Wilson, Taylor & Hunt, P.A.

(57) ABSTRACT

A method for RADIUS proxy or Diameter agent address resolution is disclosed. The method may be implemented in a network node including a plurality of message processors. The method includes receiving an inbound RADIUS or Diameter message. The method further includes determining whether address resolution is required for the inbound message. The method further includes, in response to determining that address resolution is required for the inbound message, performing the address resolution. The method further includes routing an outbound message to a destination based on a result of the address resolution, where at least one of the inbound message and the outbound message comprises a RADIUS message.

17 Claims, 24 Drawing Sheets

Related U.S. Application Data a continuation-in-part of application No. 14/827,025, filed on Aug. 14, 2015, now Pat. No. 9,668,135, and a continuation-in-part of application No. 14/928,660, filed on Oct. 30, 2015, now Pat. No. 9,923,984.

(51) Int. Cl.
  *G06F 17/30* (2006.01)
  *H04L 29/06* (2006.01)
  *H04L 29/08* (2006.01)
  *H04L 29/12* (2006.01)

(52) U.S. Cl.
  CPC .......... *H04L 65/1016* (2013.01); *H04L 67/28* (2013.01); *H04L 61/1588* (2013.01); *H04L 61/3095* (2013.01); *H04L 61/605* (2013.01); *H04L 61/6054* (2013.01)

(56) References Cited

U.S. PATENT DOCUMENTS

| | | |
|---|---|---|
| 6,006,098 A | 12/1999 | Rathnasabapathy et al. |
| 6,298,383 B1 | 10/2001 | Gutman et al. |
| 6,836,477 B1 | 12/2004 | West, Jr. et al. |
| 6,967,956 B1 | 11/2005 | Tinsley et al. |
| 7,292,592 B2 | 11/2007 | Rune |
| 7,310,307 B1 * | 12/2007 | Das .................... H04L 12/66 370/229 |
| 7,319,857 B2 | 1/2008 | Baldwin et al. |
| 7,551,926 B2 | 6/2009 | Rune |
| 7,738,488 B2 | 6/2010 | Marsico et al. |
| 7,792,981 B2 | 9/2010 | Taylor |
| 7,814,015 B2 | 10/2010 | Benedyk et al. |
| 7,844,745 B1 | 11/2010 | Darbyshire et al. |
| 7,916,685 B2 | 3/2011 | Schaedler et al. |
| 7,996,541 B2 | 8/2011 | Marathe et al. |
| 8,015,293 B2 | 9/2011 | Schaedler et al. |
| 8,532,110 B2 | 9/2013 | McCann et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,831,076 B2 | 9/2014 | Yen |
| 8,918,469 B2 | 12/2014 | Sprague et al. |
| 8,942,747 B2 | 1/2015 | Marsico |
| 9,059,948 B2 | 6/2015 | Schaedler et al. |
| 9,148,524 B2 | 9/2015 | Deo |
| 9,288,169 B2 | 3/2016 | Schaedler et al. |
| 9,319,378 B2 | 4/2016 | McCann |
| 9,668,134 B2 | 5/2017 | McCann |
| 9,668,135 B2 | 5/2017 | McCann |
| 9,918,229 B2 | 3/2018 | McCann |
| 9,923,984 B2 | 3/2018 | McCann et al. |
| 9,930,528 B2 | 3/2018 | McCann |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2005/0235000 A1 | 10/2005 | Keil |
| 2006/0002308 A1 | 1/2006 | Na et al. |
| 2006/0030320 A1 | 2/2006 | Tammi et al. |
| 2006/0045249 A1 | 3/2006 | Li et al. |
| 2006/0068762 A1 | 3/2006 | Baldwin et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172503 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0136590 A1 | 6/2007 | Nah et al. |
| 2007/0153995 A1 | 7/2007 | Fang et al. |
| 2007/0189215 A1 | 8/2007 | Wu et al. |
| 2007/0242637 A1 | 10/2007 | Dynarski et al. |
| 2007/0297419 A1 | 12/2007 | Asherup et al. |
| 2008/0002652 A1 | 1/2008 | Gupta et al. |
| 2008/0039104 A1 | 2/2008 | Gu et al. |
| 2008/0256251 A1 | 10/2008 | Huotari et al. |
| 2009/0080440 A1 | 3/2009 | Balyan et al. |
| 2009/0089435 A1 | 4/2009 | Terrill et al. |
| 2009/0129271 A1 | 5/2009 | Ramankutty et al. |
| 2009/0156213 A1 * | 6/2009 | Spinelli .................. H04W 92/02 455/436 |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0268814 A1 | 10/2010 | Cross et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0154454 A1 * | 6/2011 | Frelechoux ............ H04L 63/08 726/5 |
| 2011/0158090 A1 | 6/2011 | Riley et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0211574 A1 | 9/2011 | Li et al. |
| 2011/0225113 A1 | 9/2011 | Mann |
| 2011/0225280 A1 | 9/2011 | Delsesto et al. |
| 2011/0225281 A1 | 9/2011 | Riley et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1 | 4/2012 | Alonso Alarcon et al. |
| 2012/0096177 A1 | 4/2012 | Rasanen |
| 2012/0124220 A1 | 5/2012 | Zhou et al. |
| 2012/0129488 A1 * | 5/2012 | Patterson ............... H04M 15/50 455/406 |
| 2012/0155389 A1 | 6/2012 | McNamee et al. |
| 2012/0155470 A1 | 6/2012 | McNamee et al. |
| 2012/0177028 A1 | 7/2012 | Mo et al. |
| 2012/0201203 A1 | 8/2012 | Miyagawa et al. |
| 2012/0202550 A1 | 8/2012 | Marsico |
| 2012/0207015 A1 | 8/2012 | Marsico |

(56) References Cited

U.S. PATENT DOCUMENTS

| | | |
|---|---|---|
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1* | 9/2012 | Wallace ............... H04L 61/10 370/401 |
| 2012/0239771 A1 | 9/2012 | Rasanen |
| 2012/0311064 A1 | 12/2012 | Deo |
| 2013/0171990 A1 | 7/2013 | McCann et al. |
| 2013/0246639 A1* | 9/2013 | Nedbal ............... H04L 63/101 709/228 |
| 2013/0279497 A1 | 10/2013 | Verma et al. |
| 2013/0304843 A1 | 11/2013 | Chow et al. |
| 2014/0092899 A1* | 4/2014 | Krishna ............ H04L 61/2517 370/389 |
| 2014/0207941 A1 | 7/2014 | McCann |
| 2014/0258423 A1 | 9/2014 | Schaedler et al. |
| 2014/0321278 A1 | 10/2014 | Cafarelli et al. |
| 2014/0342690 A1 | 11/2014 | Tanouchev et al. |
| 2014/0355523 A1* | 12/2014 | Congdon ............ H04W 76/02 370/328 |
| 2015/0036486 A1 | 2/2015 | McMurry et al. |
| 2015/0117420 A1* | 4/2015 | Raman ............... H04L 61/103 370/338 |
| 2015/0149656 A1 | 5/2015 | McMurry et al. |
| 2016/0373348 A1 | 12/2016 | Renzullo et al. |
| 2017/0048190 A1 | 2/2017 | McCann |
| 2017/0048703 A1 | 2/2017 | McCann |
| 2017/0048704 A1 | 2/2017 | McCann |
| 2017/0126522 A1 | 5/2017 | McCann et al. |
| 2017/0238178 A1 | 8/2017 | McCann |
| 2017/0238179 A1 | 8/2017 | McCann |

FOREIGN PATENT DOCUMENTS

| | | |
|---|---|---|
| CN | 101079742 A | 11/2007 |
| CN | 101247321 A | 8/2008 |
| CN | 101277541 A | 10/2008 |
| CN | 101483826 A | 7/2009 |
| CN | 101867873 A | 10/2010 |
| CN | 101945047 A | 1/2011 |
| CN | 102239481 A | 11/2011 |
| CN | 102656845 A | 9/2012 |
| CN | ZL 201080065174.6 | 6/2015 |
| CN | 100037 | 7/2016 |
| CN | 103477661 B | 10/2016 |
| CN | ZL201280019607.3 | 12/2016 |
| CN | ZL201280013938.6 | 3/2017 |
| CN | ZL201280018298.8 | 3/2017 |
| CN | ZL201280018288.4 | 4/2017 |
| EP | 1 357 720 A1 | 10/2003 |
| EP | 1 630 999 A1 | 3/2006 |
| EP | 2 107 725 A1 | 10/2009 |
| EP | 2 234 422 A1 | 9/2010 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| EP | 2 522 103 A2 | 11/2012 |
| EP | 2 577 930 A2 | 4/2013 |
| EP | 2 681 940 B1 | 5/2016 |
| EP | 2 681 939 B1 | 9/2016 |
| EP | 2 522 102 B1 | 11/2016 |
| EP | 2 681 938 B1 | 12/2016 |
| JP | H10-98470 A | 4/1998 |
| JP | H11-224219 A | 8/1999 |
| JP | 2004-242326 A | 8/2004 |
| JP | 2006-513631 | 4/2006 |
| JP | 4041038 B2 | 1/2008 |
| JP | 2009-537102 | 10/2009 |
| JP | 2010-527520 | 8/2010 |
| JP | 2010-0278884 A | 12/2010 |
| JP | 2013-527999 T | 7/2013 |
| JP | 5732550 B2 | 6/2015 |
| JP | 5758508 B2 | 8/2015 |
| JP | 5759064 B2 | 8/2015 |
| JP | 5938052 B2 | 6/2016 |
| JP | 5950943 B2 | 7/2016 |
| JP | 6091657 B2 | 2/2017 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2009/086759 A1 | 7/2009 |
| WO | WO 2010/139360 A1 | 12/2010 |
| WO | WO 2011/082035 A2 | 7/2011 |
| WO | WO 2011/082090 A2 | 7/2011 |
| WO | WO 2011/082895 A1 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

Commonly-assigned, co-pending U.S. Appl. No. 14/826,289 for "Methods, Systems, and Computer Readable Media for Providing Access Network Session Correlation for Policy Control," (Unpublished, filed Aug. 14, 2015).

Commonly-assigned, co-pending U.S. Appl. No. 14/827,015 for "Methods, Systems, and Computer Readable Media for Providing Access Network Protocol Interworking and Authentication Proxying," (Unpublished, filed Aug. 14, 2015).

Commonly-assigned, co-pending U.S. Appl. No. 14/827,025 for "Methods, Systems, and Computer Readable Media for Providing Access Network Signaling Protocol Interworking for User Authentication," (Unpublished, filed Aug. 14, 2015).

Fajardo et al., "Diameter Base Protocol," RFC 6733, pp. 1-152 (Oct. 2012).

"Traffix Signaling Delivery Controller—One Platform to Deliver the Wonders of 4G," Traffix Systems, The Diameter Control Plane Experts, pp. 1-7 (2011).

"Traffix Signaling Delivery Controller (SDC)," Traffix Systems, The Diameter Control Plane Experts, pp. 1-5 (2011).

"Traffix Signaling Delivery Controller (SDC) Diameter Gateway—Use Case Development Scenarios," Traffix Systems, The Diameter Control Plane Experts, www.traffixsystems.com pp. 1-4 (2011).

"Traffix Signaling Delivery Controller Diameter Load Balancer: Scalability for your Control Plane," Traffix Systems, The Diameter Control Plane Experts, www.traffixsystems.com pp. 1-3 (2011).

Gundavelli et al., "Network Mobility (NEMO) Management Information Base," RFC 5488, pp. 1-44 (Apr. 2009).

Arkko et al., "Extensible Authentication Protocol Method for 3rd Generation Authentication and Key Agreement (EAP-AKA)," RFC 4187, pp. 1-79 (Jan. 2006).

Haverinen et al., "Extensible Authentication Protocol Method for Global System for Mobile Communications (GSM) Subscriber Identity Modules (EAP-SIM)," RFC 4186, pp. 1-80 (Jan. 2006).

Aboba et al., "Extensible Authentication Protocol (EAP)," RFC 3748, pp. 1-67 (Jun. 2004).

Calhoun et al., "Diameter Base Protocol," RFC 3588, pp. 1-147 (Sep. 2003).

Aboba et al., "RADIUS (Remote Authentication Dial In User Service) Support for Extensible Authentication Protocol (EAP)," RFC 3579, pp. 1-46 (Sep. 2003).

"ITP Operations Manual," Cisco Systems, Inc., pp. 1-320 (May 1, 2002).

"Configuring ITP Optional Features," IP Transfer Point, Cisco Systems, Inc., pp. 29-76 (2001).

"Cisco IP Transfer Point Q & A," Cisco Systems, Inc., pp. 1-15 (1992-2001).

Rigney et al., "RADIUS Accounting," RFC 2866, pp. 1-28 (Jun. 2000).

(56) References Cited

OTHER PUBLICATIONS

Final Office Action for U.S. Appl. No. 14/826,289 (dated Nov. 3, 2017).
Notice of Allowance and Fee(s) Due and Applicant-Initiated Interview Summary for U.S. Appl. No. 14/928,660 (dated Nov. 2, 2017).
Notice of Allowance and Fee(s) Due and Applicant-Initiated Interview Summary for U.S. Appl. No. 15/582,591 (dated Nov. 1, 2017).
Notice of Allowance and Fee(s) Due and Applicant-Initiated Interview Summary for U.S. Appl. No. 15/582,503 (dated Oct. 26, 2017).
Advisory Action, Examiner-Initiated Interview Summary, and AFCP 2.0 Decision for U.S. Appl. No. 14/742,679 (dated Sep. 22, 2017).
Advisory Action for U.S. Appl. No. 14/826,289 (dated Feb. 5, 2018).
Notification of the First Office Action for Chinese Patent Application No. 201480005758.2 (dated Jan. 2, 2018).
Letter Regarding Decision to Grant a Chinese Patent for Chinese Patent Appication No. ZL201280019607.3 (dated Oct. 10, 2016).
Notification of the Second Office Action for Chinese Patent Application No. 201280013938.6 (dated Oct. 9, 2016).
Notification of the Second Office Action for Chinese Patent Application No. 201280018288.4 (dated Sep. 5, 2016).
Communication under Rule 71(3) EPC for European Patent Application No. 12 751 812.4 (dated Sep. 2, 2016).
Non-Final Office Action for U.S. Appl. No. 14/827,025 (dated Aug. 26, 2016).
Decision to grant a European patent pursuant to Article 97(1) EPC for European Patent Applicaton No. 12751986.6 (dated Aug. 19, 2016).
Intent to Grant for European Patent Application No. 10841605.8 (dated Aug. 12, 2016).
Letter Regarding Office Action for Japanese Patent Application No. 2015-553784 (dated Jul. 19, 2016).
Letter Regarding Notice of Grant for Chinese Patent Application No. ZL201280018297.3 (dated Jul. 4, 2016).
Communication under Rule 71(3) EPC for European Application No. 12 751 986.6 (dated Jun. 8, 2016).
Letter Regarding Notice of grant for Japanese Patent Application No. 2013-552714 (dated May 31, 2016).
Decision to grant a European patent pursuant to Article 97(1) EPC for European Application No. 12752952.7 (dated Apr. 29, 2016).
Official Notice of Grant for Japanese Patent Application No. 2013-556860 (dated Apr. 26, 2016).
Notification of the First Office Action for Chinese Patent Application No. 201280018298.8 (dated Mar. 3, 2016).
Communication pursuant to Article 94(3) EPC for European Patent Application No. 10841605.8 (dated Feb. 22, 2016).
Communication under Rule 71(3) EPC for European Patent Application No. 12752952.7 (dated Feb. 10, 2016).
Letter Regarding Notice of Grant for Japanese Patent Application No. 2013-556855 (dated Feb. 2, 2016).
Notification of the First Office Action for Chinese Application No. 201280019607.3 (dated Feb. 1, 2016).
Notification of the First Office Action for Chinese Application No. 201280013938.6 (dated Jan. 27, 2016).
Notification of the First Office Action for Chinese Application No. 201280018297.3 (dated Jan. 15, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Notice of Allowance and Fee(s) Due for U.S. Appl. No. 13/748,547 (dated Dec. 11, 2015).
Letter Regarding Office Action for Japanese Patent Application No. 2013-552714 (dated Dec. 8, 2015).
Letter Regarding Final Rejection for Japanese Patent Application No. 2013-556860 (dated Nov. 17, 2015).
Communication of European publication number and information on the application of Article 67(3) EPC for European Application No. 14702996.1 (dated Nov. 4, 2015).
Notice of Allowance and Fee(s) Due and Applicant-Initiated Interview Summary for U.S. Appl. No. 14/190,071 (dated Oct. 30, 2015).
Advisory Action for U.S. Appl. No. 13/748,547 (dated Oct. 16, 2015).
Supplemental Notice of Allowability & Response to Rule 312 Communication for U.S. Appl. No. 13/465,552 (dated Aug. 27, 2015).
Final Office Action for U.S. Appl. No. 13/748,547 (dated Aug. 10, 2015).
Letter Regarding Publication of Patent for Japanese Patent Application No. 2014-509509 (dated Aug. 5, 2015).
Letter Regarding Publication of Patent for Japanese Patent Application No. 2013-556857 (dated Aug. 5, 2015).
Letter Regarding Office Action for Japanese Patent Application No. 2013-556860 (dated Jul. 21, 2015).
Non-Final Office Action for U.S. Appl. No. 14/190,071 (dated Jul. 8, 2015).
Letter Regarding Publication of Patent for Japanese Patent Application No. 2013-556675 (dated Jun. 10, 2015).
Letter Regarding Notice of Grant for Japanese Patent Application No. 2014-509509 (dated Jun. 2, 2015).
Letter Regarding Notice of Grant for Japanese Patent Application No. 2013-556857 (dated May 26, 2015).
Notice of Allowance and Fee(s) Due and Examiner-Initiated Interview Summary for U.S. Appl. No. 13/465,552 (dated May 20, 2015).
Decision to Grant for Chinese Patent Application No. 201080065174.6 (dated Apr. 16, 2015).
Second Office Action for Japanese Patent Application No. 2013-556857 (dated Apr. 14, 2015).
Letter Regarding Notice of Grant for Japanese Patent Application No. 2013-556675 (dated Mar. 31, 2015).
Letter Regarding Office Action for Japanese Patent Application No. 2013-556855 (dated Feb. 24, 2015).
Notice of Allowance and Fee(s) Due and Examiner-Initiated Interview Summary for U.S. Appl. No. 13/192,410 (dated Feb. 12, 2015).
Applicant-Initiated Interview Summary for U.S. Appl. No. 13/465,552 (dated Feb. 9, 2015).
Notice of Panel Decision from Pre-Appeal Brief Review for U.S. Appl. No. 13/192,410 (dated Feb. 4, 2015).
Extended European Search Report for European Patent Application No. 12751986.6 (dated Jan. 20, 2015).
Non-Final Office Action for U.S. Appl. No. 13/748,547 (dated Jan. 5, 2015).
Supplemental Notice of Allowability for U.S. Appl. No. 13/366,928 (dated Dec. 26, 2014).
Non-Final Office Action for U.S. Appl. No. 13/465,552 (dated Oct. 17, 2014).
Letter Regarding Office Action for Japanese Patent Application No. 2013-556675 (dated Sep. 30, 2014).
Final Office Action for U.S. Appl. No. 13/192,410 (dated Sep. 25, 2014).
First Office Action for Japanese Application No. 2013-556857 (dated Sep. 24, 2014).
Notice of Allowance and Fee(s) Due for U.S. Appl. No. 13/366,928 (dated Sep. 3, 2014).
Extended European Search Report for European Application No. 12752952.7 (dated Aug. 27, 2014).
Notification of the First Office Action for Chinese Application No. 201080065174.6 (dated Aug. 13, 2014).
Extended European Search Report for European Application No. 12751783.7 (dated Jul. 22, 2014).
Extended European Search Report for European Application No. 12751812.4 (dated Jul. 16, 2014).
Notice of Allowance and Fee(s) Due for U.S. Appl. No. 13/409,893 (dated Jul. 10, 2014).
Notice of Allowance and Fee(s) Due for U.S. Appl. No. 13/409,914 (dated Apr. 25, 2014).
Supplemental Notice of Allowability for U.S. Appl. No. 13/409,949 (dated Apr. 24, 2014).

(56) References Cited

OTHER PUBLICATIONS

Notification of Transmittal of the International Search Report and the Written Opinion of the International Searching Authority, or the Declaration for International Patent Application No. PCT/US2014/011548 (dated Mar. 28, 2014).
Non-Final Office Action for U.S. Appl. No. 13/366,928 (dated Mar. 21, 2014).
Non-Final Office Action for U.S. Appl. No. 13/192,410 (dated Feb. 20, 2014).
Communication of European publication number and information on the application of Article 67(3) EPC for European Application No. 12781800.3 (dated Feb. 12, 2014).
Advisory Action Before the Filing of an Appeal Brief for U.S. Appl. No. 13/366,928 (dated Feb. 10, 2014).
Extended European Search Report for European Application No. 10841605.8 (dated Feb. 3, 2014).
Notice of Allowance and Fee(s) Due for U.S. Appl. No. 13/409,949 (dated Jan. 14, 2014).
Final Office Action for U.S. Appl. No. 13/409,914 (dated Dec. 30, 2013).
Notification of Publication and Entry into Examination Procedure for Chinese Patent Application No. 201280013938.6 (dated Dec. 18, 2013).
Communication of European publication number and information on the application of Article 67(3) EPC for European Application No. 12751986.6 (dated Dec. 11, 2013).
Communication of European publication number and information on the application of Article 67(3) EPC for European Application No. 12751783.7 (dated Dec. 11, 2013).
Communication of European publication number and information on the application of Article 67(3) EPC for European Application No. 12751812.4 (dated Dec. 11, 2013).
Communication of European publication number and information on the application of Article 67(3) EPC for European Application No. 12741984.4 (dated Nov. 13, 2013).
Declaration of Mark Kanode for U.S. Appl. No. 13/409,893 (dated Nov. 1, 2013).
Advisory Action for U.S. Appl. No. 13/192,410 (dated Oct. 24, 2013).
Final Office Action for U.S. Appl. No. 13/366,928 (dated Oct. 23, 2013).
Applicant-Initiated Interview Summary for U.S. Appl. No. 13/192,410 (dated Oct. 18, 2013).
Final Office Action for U.S. Appl. No. 13/409,949 (dated Sep. 19, 2013).
Advisory Action Before the Filing of an Appeal Brief for U.S. Appl. No. 13/409,893 (dated Sep. 13, 2013).
Notice of Allowance and Fee(s) Due for U.S. Appl. No. 12/974,869 (dated Aug. 19, 2013).
Final Office Action for U.S. Appl. No. 13/192,410 (dated Aug. 5, 2013).
Final Office Action for U.S. Appl. No. 13/409,893 (dated Jul. 1, 2013).
Non-Final Office Action for U.S. Appl. No. 13/409,914 (dated Jun. 7, 2013).
Notice of Allowance and Fee(s) Due for U.S. Appl. No. 13/412,352 (dated May 28, 2013).
Non-Final Office Action for U.S. Appl. No. 13/366,928 (dated Mar. 26, 2013).
Non-Final Office Action for U.S. Appl. No. 13/409,949 (dated Feb. 15, 2013).
Notice of Allowance and Fee(s) Due for U.S. Appl. No. 13/366,928 (dated Jan. 7, 2013).
Non-Final Office Action for U.S. Appl. No. 13/192,410 (dated Dec. 20, 2012).
Non-Final Office Action for U.S. Appl. No. 13/409,893 (dated Dec. 13, 2012).
Non-Final Official Action for U.S. Appl. No. 12/409,914 (dated Nov. 6, 2012).
Notification of Transmittal of the International Search Report and the Written Opinion of the International Searching Authority, or the Declaration for International Patent Application No. PCT/US2012/036784 (dated Nov. 1, 2012).
Non-Final Official Action for U.S. Appl. No. 13/412,352 (dated Oct. 26, 2012).
Communication of European publication number and information on the application of Article 67(3) EPC for European Patent Application No. 10841605.8 (dated Oct. 17, 2012).
Notification of Transmittal of the International Search Report and the Written Opinion of the International Searching Authority, or the Declaration for International Patent Application No. PCT/US2012/027281 (dated Jun. 15, 2012).
Notification of Transmittal of the International Search Report and the Written Opinion of the International Searching Authority, or the Declaration for International Application No. PCT/US2012/027263 (dated Jun. 14, 2012).
Notification of Transmittal of the International Search Report and the Written Opinion of the International Searching Authority, or the Declaration for International Patent Application No. PCT/US2012/027736 (dated Jun. 12, 2012).
Notification of Transmittal of the International Search Report and the Written Opinion of the International Searching Authority, or the Declaration for International Patent Application No. PCT/US2012/023971 (dated Jun. 11, 2012).
Notification of Transmittal of the International Search Report and the Written Opinion of the International Searching Authority, or the Declaration for International Patent Application No. PCT/US2012/027269 (dated Jun. 11, 2012).
"Multi-Protocol Routing Agent User's Guide," 910-6404-001 Revision A, Policy Management, Tekelec, pp. 1-70 (Jun. 2012).
Decision to grant a European patent pursuant to Article 97(1) EPC for European Application No. 05854512.0 (dated Mar. 15, 2012).
Communication under Rule 71(3) EPC for European application No. 05854512.0 (dated Nov. 11, 2011).
Notification of the Transmittal of the International Search Report and the Written Opinion of the International Searching Authority, or the Declaration for International Application No. PCT/US2010/061934 (dated Oct. 25, 2011).
Notice of Allowance and Fee(s) Due for U.S. Appl. No. 11/303,757 (dated May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (dated Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (dated Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).

(56) References Cited

OTHER PUBLICATIONS

"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE+ePC=EPS), IMS, PCC and SDM," EFORT, pp. 1-229 (Part 1 of 2) (May 2010).
Znaty, "Diameter, GPRS, (LTE+ePC=EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Communication pursuant to Article 94(3) EPC for European Application No. 05854512.0 (dated Feb. 8, 2010).
Final Official Action for U.S. Appl. No. 11/303,757 (dated Dec. 9, 2009).
"3rd Generation Partnership Project; Technical Specification Group Services and System Aspects; Policy and charging control architecture (Release 9)," 3GPP TS 23.203, V9.3.0 (Dec. 2009).
Supplementary European Search Report for European Application No. 05854512.0 (dated Nov. 17, 2009).
Official Action for U.S. Appl. No. 11/303,757 (dated May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (dated Oct. 6, 2008).
Official Action for U.S. Appl. No. 11/303,757 (dated May 7, 2008).
Notification of Transmittal of the International Search Report and the Written Opinion corresponding to International Application No. PCT/US05/45813 (dated Mar. 24, 2008).
Official Action for U.S. Appl. No. 11/303,757 (dated Feb. 21, 2008).
Chiba et al., "Dynamic Authorization Extensions to Remote Authentication Dial in User Service (RADIUS)," RFC 5176, pp. 1-32 (Jan. 2008).
Restriction Requirment for U.S. Appl. No. 11/303,757 (dated Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Liu et al., "IBM Technical Library, Introduction to Diameter," pp. 1-9, http://www.ibm.com/developerworks/wireless/library/wi-diameter (Jan. 24, 2006).
Rouse, "Platform," http://searchservervirtualization.techtarget.com/definition/platform, pp. 1-2 (2006-2009).
Camarillo et al., "The 3G IP Multimedia Subsystem (IMS), Merging the Internet and the Cellular Worlds," Second Edition (2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).

Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003)
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Calhoun et al., "Diameter Base Protocol," draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Rigney et al., "Remote Authentication Dial in User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Non-Final Office Action for U.S. Appl. No. 14/826,289 (dated Apr. 5, 2018).
Notice of Allowance and Fee(s) Due and Applicant-Initiated Interview Summary for U.S. Appl. No. 15/582,503 (Oct. 26, 2017).
Applicant Initiated Interview Summary for U.S. Appl. No. 14/826,289 (dated Jul. 27, 2017).
Non-Final Office Action for U.S. Appl. No. 14/928,660 (dated Jul. 21, 2017).
Non-Final Office Action for U.S. Appl. No. 15/582,503 (dated Jun. 30, 2017).
Non-Final Office Action for U.S. Appl. No. 15/582,591 (dated Jun. 30, 2017).
Final Office Action for U.S. Appl. No. 14/742,679 (dated Jun. 30, 2017).
Non-Final Office Action for U.S. Appl. No. 14/826,289 (dated May 1, 2017).
Communication pursuant to Article 94(3) EPC for European Application No. 12 751 783.7 (dated Mar. 15, 2017).
Notice of Allowance and Fee(s) Due for U.S. Appl. No. 14/827,015 (dated Mar. 10, 2017).

(56) References Cited

OTHER PUBLICATIONS

Letter Regarding Decision to Grant for Chinese Application No. ZL201280018288.4 (dated Feb. 14, 2017).
Letter Regarding Decision to Grant for Chinese Application No. ZL201280013938.6 (dated Feb. 3, 2017).
Non-Final Office Action for U.S. Appl. No. 14/742,679 (dated Feb. 2, 2017).
Letter Regarding Notice of Grant for Japanese Patent Application No. 2015-553784 (dated Jan. 24, 2017).
Notice of Allowance and Fee(s) Due for U.S. Appl. No. 14/827,025 (dated Jan. 20, 2017).
Letter Regarding Decision to Grant for Chinese Patent Application No. ZL201280018298.8 (dated Jan. 10, 2017).
Extended European Search Report for European Patent Application No. 12741984.4 (dated Dec. 20, 2016).
Applicant-Initiated Interview Summary for U.S. Appl. No. 14/827,025 (dated Dec. 13, 2016).
Decision to grant a European patent pursuant to Article 97(1) EPC for European Patent Application No. 12751812.4 (dated Nov. 24, 2016).
Non-Final Office Action for U.S. Appl. No. 14/827,015 (dated Oct. 31, 2016).
Decision to grant a European patent pursuant to Article 97(1) EPC for European Patent Application No. 10841605.8 (dated Oct. 27, 2016).
Non-Final Office Action for U.S. Appl. No. 14/742,679 (dated Jun. 12, 2018).

* cited by examiner

US 10,084,755 B2

METHODS, SYSTEMS, AND COMPUTER READABLE MEDIA FOR REMOTE AUTHENTICATION DIAL IN USER SERVICE (RADIUS) PROXY AND DIAMETER AGENT ADDRESS RESOLUTION

PRIORITY CLAIM

This application is a continuation-in-part of U.S. patent application Ser. No. 14/827,015, filed Aug. 14, 2015, U.S. patent application Ser. No. 14/827,025, filed Aug. 14, 2015, and U.S. patent application Ser. No. 14/928,660, filed Oct. 30, 2015, the disclosures of which are incorporated herein by reference in their entireties.

TECHNICAL FIELD

The subject matter described herein relates to address resolution in networks that utilize the RADIUS protocol. More particularly, the subject matter described herein relates to methods, systems and computer readable media for RADIUS proxy and Diameter agent address resolution.

BACKGROUND

RADIUS messages are used for authentication, authorization, and accounting for users in some communications networks. Unlike Diameter messages, which have replaced RADIUS messages in some networks, RADIUS messages do not have a destination host parameter. It is assumed that a RADIUS message transmitted by one host is intended for the host that receives the RADIUS message.

If a RADIUS proxy agent is introduced into a network, the proxy agent may receive messages that are intended for other nodes. However, because RADIUS messages do not identify the ultimate destinations, the proxy or proxy agent must have a mechanism for determining the destination for RADIUS messages or other types of messages that are based on RADIUS messages. The process of translating identifiers in messages to destination addresses is referred to as address resolution.

There is also a need for Diameter agent address resolution when a Diameter agent receives an inbound RADIUS or Diameter message and the outbound message is a Diameter message. If the outbound message is a Diameter message, and there are multiple destinations that provide the same service but for different groups of subscribers, address resolution may be needed to determine which of the destinations contain the records needed to process a message relating to a particular subscriber.

Accordingly, there exists a need for methods, systems, and computer readable media for RADIUS proxy and Diameter agent address resolution.

SUMMARY

A method for RADIUS proxy or Diameter agent address resolution is disclosed. The method may be implemented in a network node including a plurality of message processors. The method includes receiving an inbound RADIUS or Diameter message. The method further includes determining whether address resolution is required for the inbound message. The method further includes, in response to determining that address resolution is required for the inbound message, performing the address resolution. The method further includes routing an outbound message to a destination based on a result of the address resolution, where at least one of the inbound message and the outbound message comprises a RADIUS message.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
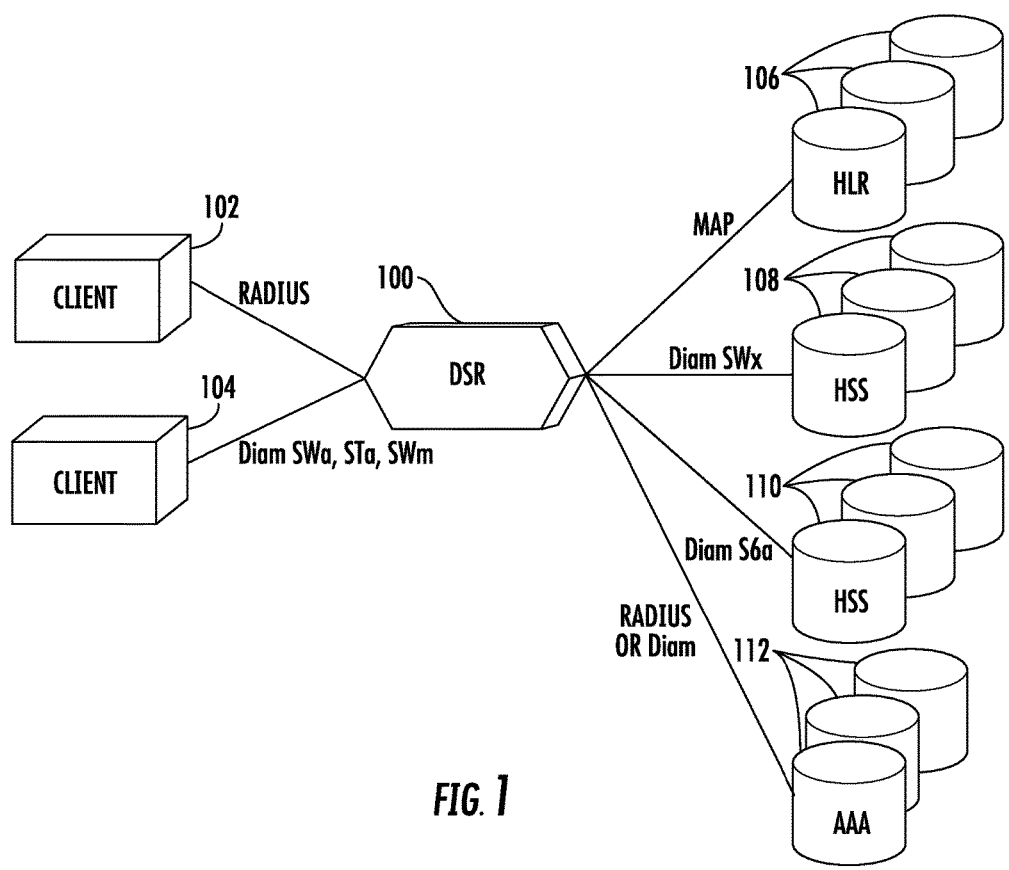
FIG. 1 is a network diagram illustrating exemplary applications for RADIUS proxy and Diameter agent address resolution according to an aspect of the subject matter described herein.

The subject matter described herein includes methods, systems, and computer readable media for RADIUS proxy and Diameter agent address resolution. RADIUS proxy address resolution refers to address resolution performed when either the inbound or outbound message is RADIUS. Diameter agent address resolution is address resolution when the outbound message is Diameter. Address resolution is the process by which a non-routable address, such as an IMSI, MSISDN number, or subscriber IP address in a message is used to determine a destination for the message. RADIUS proxy or Diameter agent address resolution can be range based, where the IMSI or MSISDN number in a message is compared to ranges of IMSIs or MSISDNs for a destination, or full subscriber address based, where the IMSIs or MSISDNs extracted from a message are compared to a full subscriber address corresponding to a destination. The outbound message resulting after a RADIUS proxy address resolution can be a RADIUS message, a Diameter message, a mobile application part (MAP) message, depending on the application. FIG. 1 is a network diagram illustrating exemplary applications for RADIUS proxy address resolution according to an aspect of the subject matter described herein. Referring to FIG. 1, network node, such as a DSR 100 may implement RADIUS proxy address resolution. DSR 100 may interface with clients 102 and 104 using the RADIUS protocol or the Diameter protocol. In one example, clients 102 and 104 may each be a Wi-Fi access gateway, a wireless access point, a broadband network gateway, or other node through which mobile devices connect to a Wi-Fi or other access network.

DSR 100 communicates with home location registers (HLRs) 106 using MAP, with HSSs 108 using Diameter messaging on a Diameter SWx interface and with HSSs 110 using Diameter messaging on a Diameter S6a interface. DSR 100 implements authentication proxying and protocol interworking, DSR 100 may appear as an AAA server to both client 102 and nodes 106, 108, and 110. Appearing as an AAA server to clients 102 and 104 may include terminating authentication signaling from client 102, obtaining authentication challenge information from nodes 106, 108, and 110, communicating that challenge information to client 102, receiving responses to the challenge information, determining whether the challenge responses match the challenge information, and communicating an indication of successful or unsuccessful authentication to nodes 106, 108, and 110. Because DSR 100 is required to store expected result information, DSR 100 is stateful with respect to authentication information.

As part of performing authentication proxying and protocol interworking, DSR 100 may perform network address resolution. For example, in order to identify the correct HLR or HSS to which an outbound message should be routed, DSR 100 may perform an address resolution. Some network operators may provision HSSs with records for different groups of subscribers. In order to identify the HSS that contains a record for a record for a particular subscriber, DSR 100 will perform the address resolution using IMSI or MSISDN in received RADIUS message.

Another application for which DSR 100 may perform network address resolution is interworking for AAA authentication or accounting. For example, DSR 100 may receive RADIUS messages that require authentication or accounting by one of AAA servers 112. As with HSSs or HLRs, AAA servers 112 may be provisioned with authentication and accounting records for different groups of subscribers. Accordingly, DSR 100 may receive a RADIUS message and perform an address resolution to determine which AAA server 112 contains the authentication or accounting record for a particular subscriber and may route an outbound RADIUS or Diameter message to the identified AAA server.

Figure 2:
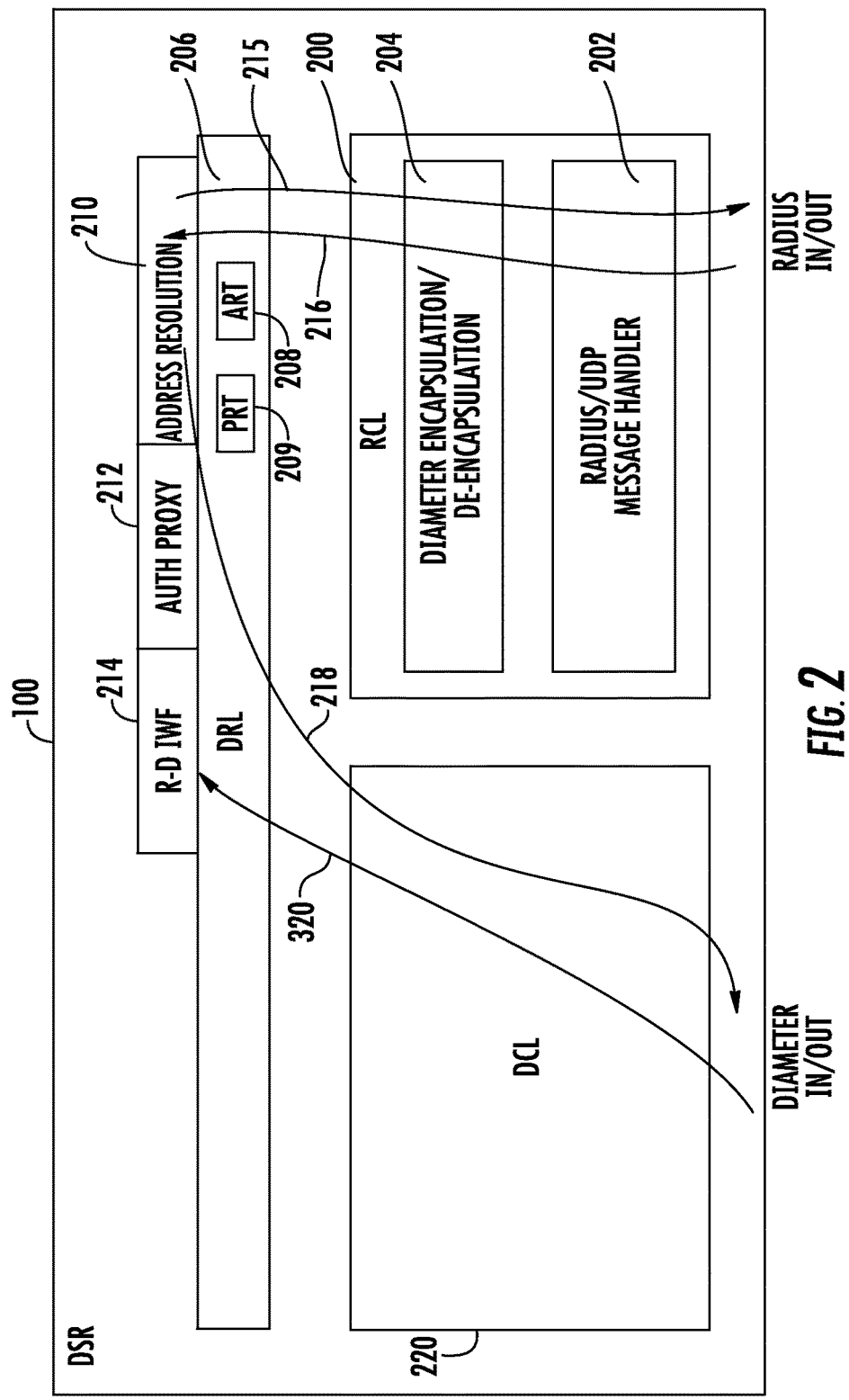
FIG. 2 is a block diagram illustrating exemplary components of a Diameter signaling router (DSR) implementing RADIUS proxy address and Diameter agent resolution according to an aspect of the subject matter described herein.

FIG. 2 is a block diagram illustrating exemplary components of DSR 100 for performing address resolution and other applications according to an aspect of the subject matter described herein. Referring to FIG. 2, DSR 100 includes a RADIUS connection layer (RCL) 200 that forms inbound and outbound processing of RADIUS messages. RCL 200 includes a RADIUS/UDP (user datagram protocol)

message handler 202 that receives inbound UDP datagrams that encapsulate RADIUS messages and removes the RADIUS messages from the UDP datagrams. RADIUS/UDP message handler 202 passes the inbound messages to Diameter encapsulation/de-encapsulation module 204, which encapsulates the RADIUS messages in Diameter messages for internal processing within DSR 100. A Diameter routing layer (DRL) 206 may perform a lookup in an application routing table (ART) 208 to determine which applications are required to process an inbound message. One of the applications that may be required is address resolution module 210. Other applications include RADIUS-Diameter interworking function (R-D IWF) 214 and an authentication proxy 212.

Once the address resolution has been performed for an inbound message, the message is passed back to DRL 206. DRL 206, for outbound messages, performs a lookup in peer routing table (PRT) 209 to identify the interface associated with the message destination and forwards the message to that interface. In the example illustrated by arrows 215 and 216, the inbound message is a RADIUS message and the outbound message is a RADIUS message. Accordingly, DRL 206 may forward the outbound message to RCL 200. Diameter encapsulation/de-encapsulation module 204 removes the Diameter message wrapper. RADIUS/UDP message handler 202 encapsulates the RADIUS message in a UDP datagram and forwards the message to a destination.

If the outbound message is a Diameter message, as indicated by arrow 218, DRL 206 may forward the message to Diameter connection layer (DCL) 220. DCL 220 forwards the Diameter message to the Diameter peer node. In yet another application, DSR 100 may perform address resolution for inbound Diameter messages, as indicated by arrow 320.

Figure 3:
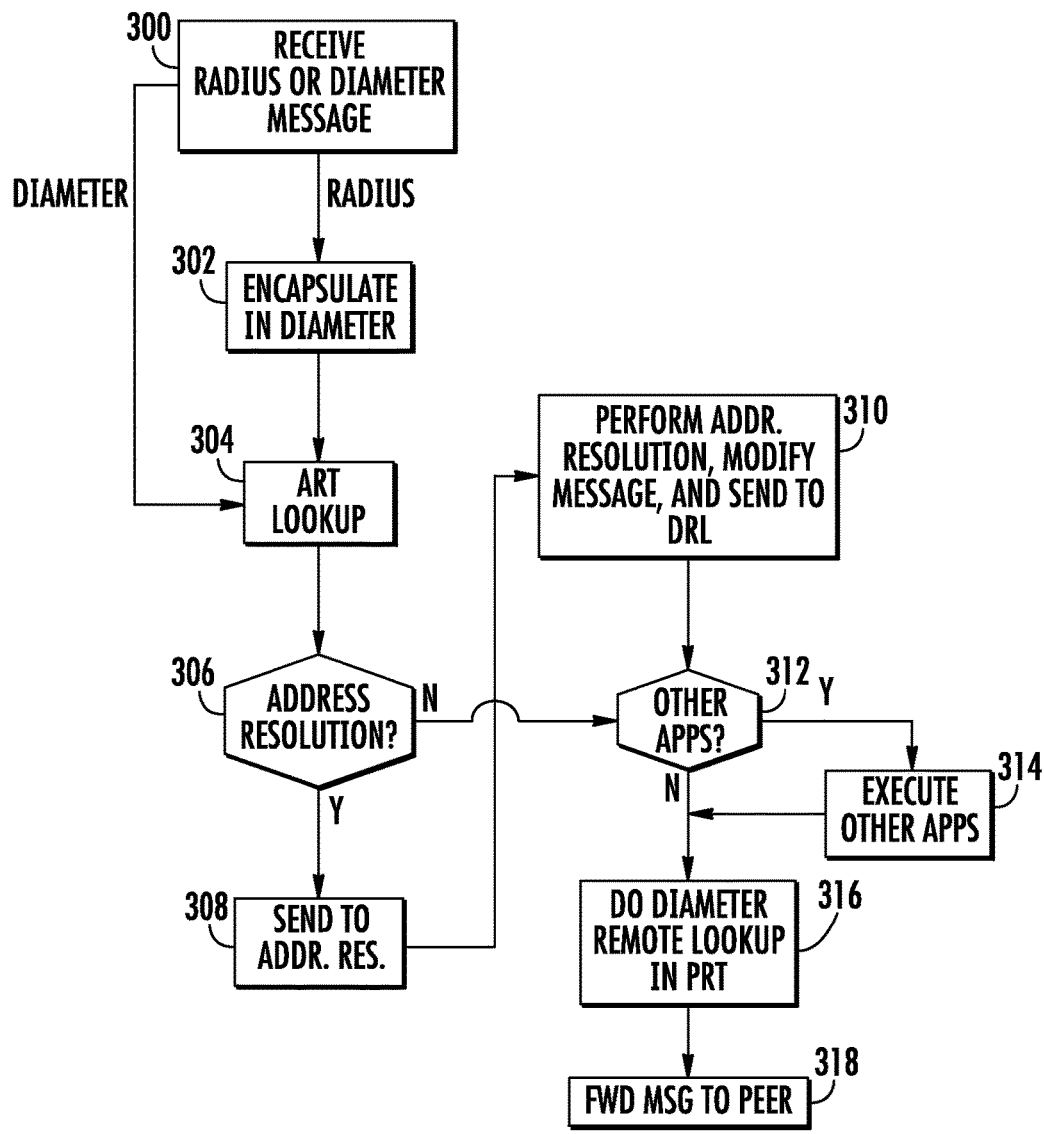
FIG. 3 is a flow chart illustrating an exemplary process for RADIUS proxy and Diameter agent address resolution according to an aspect of the subject matter described herein.

FIG. 3 is a flow chart illustrating an exemplary process for RADIUS proxy and Diameter agent address resolution according to an aspect of the subject matter described herein. Referring to FIG. 3 in step 300, a RADIUS or Diameter message is received.

From step 300, the processing varies based on whether the message is a RADIUS message or Diameter message. If the message is a RADIUS message, the message may be received by RCL 200 illustrated in FIG. 2, and RADIUS/UDP message handler 202 may remove the RADIUS message from a UDP datagram and pass the message to Diameter encapsulation/de-encapsulation module 204.

If the inbound message is RADIUS, control proceeds to step 302, where the RADIUS message is encapsulated in a Diameter message. Diameter encapsulation/de-encapsulation module 204 may encapsulate the RADIUS message in a Diameter envelope and pass the message to DRL 206.

If the received message is a Diameter message or following Diameter encapsulation of the RADIUS message in step 302, control proceeds to step 304, a lookup is performed in ART 208. For example, DRL 206 may perform a lookup in ART 208 to identify applications required for the received message. Table 1 shown below illustrates exemplary entries that may be included in the application routing table. The application routing table maps message types to applications within DSR 100. In the first entry in the table, a RADIUS access request message requesting authentication challenge information is mapped to the address resolution application and the authentication proxy application. In the second entry, a Diameter EAP request message is mapped to the address resolution application and the RADIUS-Diameter interworking function application. Other applications and message types may be included in the application routing table without departing from the scope of the subject matter described herein.

TABLE 1

Application Routing Table

| Message Type | Application(s) |
| --- | --- |
| RADIUS Access Request (Authentication Challenge) | Address Resolution, Authentication Proxy |
| Diameter EAP Request | Address Resolution, RADIUS-Diameter IWF |

In step 306, it is determined whether address resolution is required. If address resolution is required, DRL 206 passes the message to address resolution module 210, as indicated by step 308.

In step 310, address resolution is performed, the message is modified based on results of the address resolution, and the message is returned to the Diameter routing layer. As stated above, performing address resolution may include mapping an IMSI or MSISDN in a message to a routable address or a network node. The address resolution may be range based or full subscriber address based. Table 2 shown below illustrates an example of address resolution table entries.

TABLE 2

Address Resolution Table

| IMSI or MSISDN | Routable Address |
| --- | --- |
| IMSI1 | HLR1 |
| IMSI2-IMSI9999 | HLR2 |
| MSISDN1-MSISDN9999 | AAA1 |
| MSISDN100 | AAA2 |

In Table 2, the left-hand column includes individual subscriber identifiers and ranges of subscriber identifiers. The right-hand column includes routable addresses. The identifiers and addresses are shown symbolically for illustrative purposes, it is understood that actual addresses may include Diameter host IDs, IP addresses, or point codes for the routable addresses and actual IMSI or MSISDN numbers for the first column. In Table 2, the first entry maps IMSI1 to the routable address for HLR1. The second entry maps IMSIs 2-9999 to the routable address for HLR2. The first entry corresponds to an individual or full subscriber address resolution and the second entry corresponds to a range based address resolution. It should be noted that the first entry is outside the range of the second entry. In another example, individual entries may represent exceptions to range based entries. For example, in the fourth entry, MSISDN100, is within the range of the third entry, MSISDN1-MSISDN9999. In such a case, the full subscriber address entry represents an exception to the range based entry, and the routable address corresponding to the exception may be used to route the outbound message.

The subject matter described herein is not limited to the address resolution keys in column 1 of Table 2. In an alternate implementation, the keys may also include subscriber IP addresses and IF multimedia subsystem (IMS) public or private identities. Like the entries for IMSIs and MSISDNs in Table 2, entries for IP addresses and IMS pubic or private identities can be range based or full subscriber address based, and full subscriber addresses for IP addresses and IMS public or private identities can be exceptions to ranges or outside of ranges.

In step 312, after performing the address resolution, the message is sent back to the DRL and it is determined whether other applications need to be applied to the message. Similarly, if address resolution is not required, it is still determined whether other applications are required. Accordingly, if other applications such as authentication proxying and/or RADIUS-Diameter interworking are required, the other applications are executed, in step 314. Executing the other applications may include determining the outbound message type. For example, if the inbound message requires authentication proxying, the outbound message can be Diameter, RADIUS, or MAP, depending on the protocol used by the destination HLR or HSS. Similarly, if the inbound message requires RADIUS to Diameter interworking, the outbound message can be RADIUS or Diameter. Specific call flows illustrating examples of inbound and outbound message types will be described below.

Once the outbound message is formulated by the application, the outbound message is then passed back to DRL and control proceeds to step 316 where a route lookup is performed in peer routing table 209. Peer routing table 209 maps the routable addresses determined in the address resolution to the outbound interface. Table 3 shown below illustrates an example of data that may be included in peer routing table 209.

TABLE 3

Peer Routing Table

| Routable Address | Outbound Connection |
|---|---|
| HLR1 | C1 |
| HLR2 | C2 |
| AAA1 | C3 |
| AAA2 | C4 |

In Table 3, the left-hand column includes routable addresses obtained from the address resolution and the right-hand column lists outbound connections. In the DSR, the outbound interfaces may be associated with connections on message processors which are labelled C1-C4. Once the message processor is identified in step 316, the message is forwarded to the identified message processor. In step 318, the message is forwarded to the peer via the identified message processor. An exemplary hardware architecture for DSR 100 illustrating the message processors will be described in more detail below.

Figure 4A:
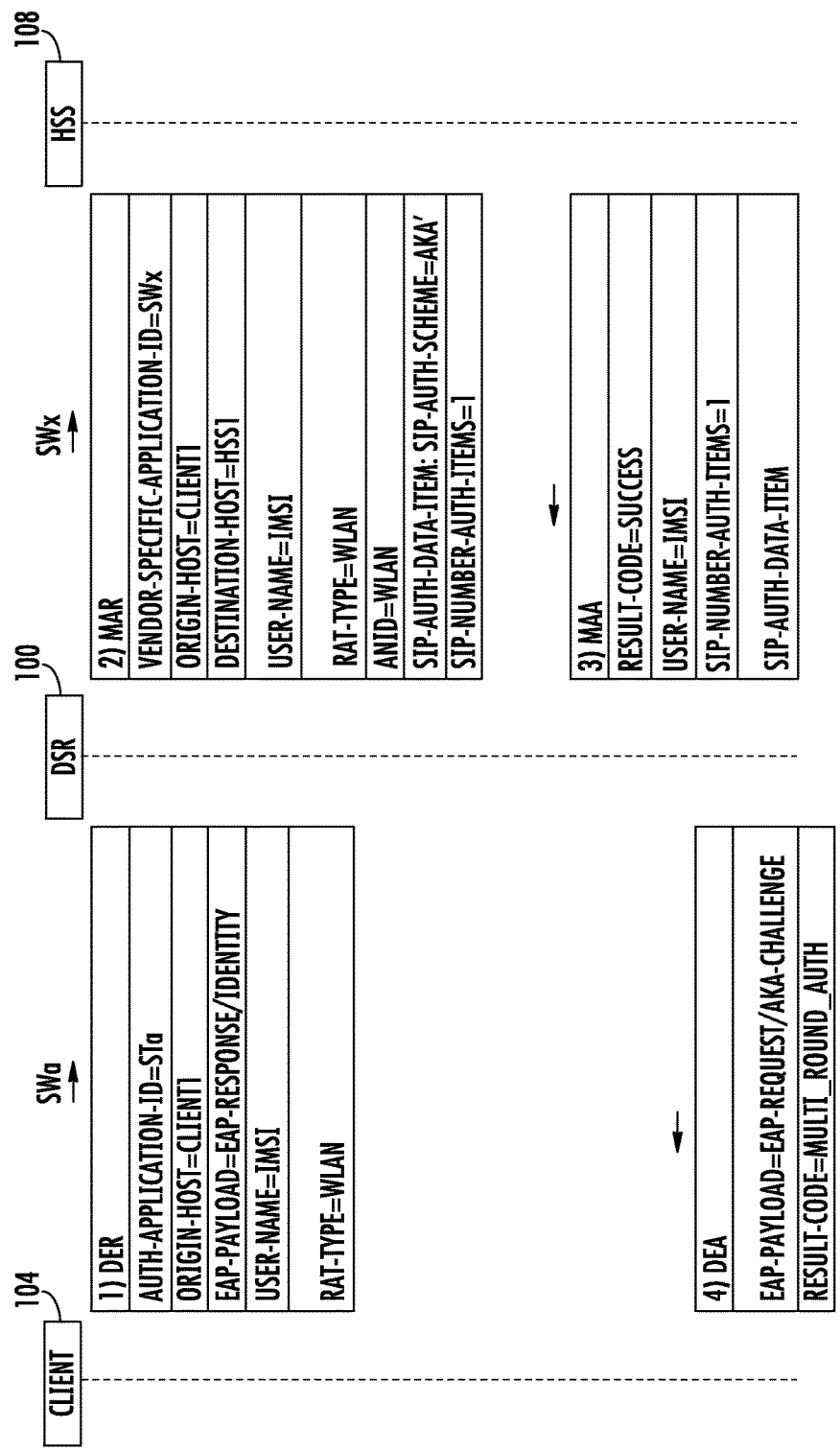
FIG. 4A is a message flow diagram illustrating protocol interworking and authentication proxying performed by a DSR between a Diameter SWa interface and a Diameter SWx interface according to an aspect of the subject matter described herein.

As indicated above, one application for address resolution is authentication proxying and protocol interworking. One type of authentication proxying and protocol interworking performed by DSR 100 is authentication proxying and protocol interworking between a Diameter SWa (or STa, SWm) interface and a Diameter SWx interface. FIG. 4A illustrates an exemplary message flow for Diameter SWa to Diameter SWx interworking and authentication proxying performed by DSR 100 according to an aspect of the subject matter described herein. Not all AVPs may be shown in the messages. Referring to FIG. 4A, client 104 sends a Diameter extensible authentication protocol (EAP) request (DER) message to DSR 100 on the SWa interface in response to a client seeking cellular network authentication when attempting to access the cellular network through a Wi-Fi network. The base extensible authentication protocol is described in IETF RFC 3748, Extensible Authentication Protocol (EAP), June 2004. RADIUS support for EAP is described in IETF RFC 3579, RADIUS (Remote Dial In User Service) Support for Extensible Authentication Protocol (EAP), September 2003. EAP methods for third generation authentication are found in IETF RFC 4187, Extensible Authentication Protocol Method for $3^{rd}$ Generation Authentication and Key Agreement (EAP-AKA), January 2006 and IETF RFC 5488, Extensible Authentication Protocol Method for $3^{rd}$ Generation Authentication and Key Agreement (EAP-AKA'), May 2009. The use of EAP for SIM card authentication is described in IETF RFC 4186, Extensible Authentication Protocol Method for Global System for Mobile Communications (GSM) Subscriber Identity Modules (EAP-SIM), January 2006. The disclosure of each of these RFCs is incorporated herein by reference in its entirety.

Returning to FIG. 4A, the DER message includes an EAP payload AVP and information for identifying mobile device from the mobile device's SIM card. In the illustrated example, this information includes the client IMSI. The DER message also includes an authentication application identifier identifying the application seeking authentication as an STa application. The DER message identifies client 104 as the origin host. The EAP payload in the message identifies the message as an EAP response including a real or pseudo identifier for the mobile device seeking authentication.

Because the SWx interface is a Diameter interface that does not use the EAP protocol, DSR 100 cannot simply forward the EAP payload to the authenticating entity in the cellular network. Accordingly, DSR 100 terminates the EAP protocol on the SWa interface, performs address resolution using the IMSI to identify HSS 108 as the message destination as HSS 108 and issues authentication messaging to HSS 108 according to the native protocol used for authentication by HSS 108. In the illustrated example, the native protocol is Diameter SWx. Accordingly, in response to the DER message, DSR 100 communicates with HSS 108 using a Diameter multimedia-auth-request (MAR) message to obtain authentication vectors. The MAR message includes the IMSI. The MAR message identifies the origin host as client 104 and the destination host as HSS 108. In response to the MAR message, HSS 108 extracts the IMSI from the MAR message and performs a lookup in its subscriber database. If HSS 108 locates a record for the subscriber, HSS 108 extracts authentication vectors, including authentication challenge information to be presented to the mobile device seeking authentication. HSS 108 formulates a multimedia-auth-answer (MAA) message including the authentication challenge information. The MAA message also includes authentication vector from which DSR 100 derives keys usable by the mobile device to access the network. One key that is derived is a master session key which is usable for link-level security when communicating messaging between the mobile device and the cellular network.

Upon receiving the MAA message, DSR 100 stores an expected response to the authentication challenge information and formulates and sends a Diameter EAP answer (DEA) message to client 104. The DEA message includes authentication information, such as an AT_RAND field that contains GSM RAND parameters, AT_AUTN, etc. This information is to be presented to the mobile device seeking authentication. The DEA message may also include an AT_MAC (message authentication code) that contains an authentication code calculated over the EAP payload and used to authenticate the EAP message.

Figure 4B:
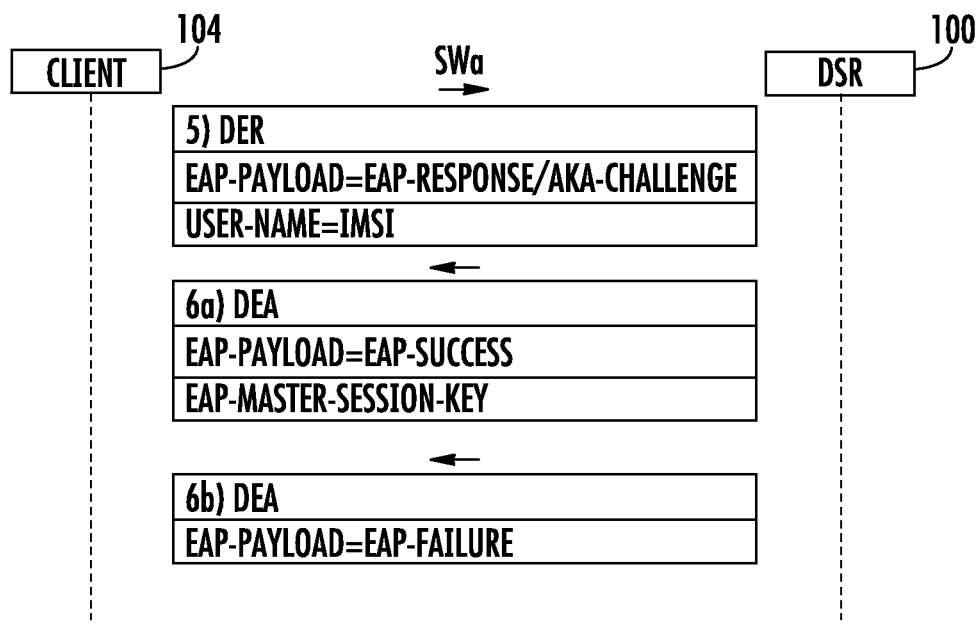
FIG. 4B is a continuation of the message flow illustrated FIG. 4A.

FIG. 4B is a continuation of the message flow illustrated in FIG. 4A. Upon receiving the MAA message including the authentication challenge information, client 104 communicates the challenge information to the mobile device, and the SIM card on the mobile device computes a response to the authentication challenge and communicates the response to client 104. In message 5 in FIG. 4B, which is a Diameter DER message, client 104 communicates the response to DSR 100. Upon receiving the authentication challenge, DSR 100 accesses the stored expected response and determines whether the received response matches the expected response. If the received response matches the expected response, DSR 100 forwards DEA message 6A indicating a successful authentication to client 104, which forwards the message to the mobile device seeking authentication. The DEA message includes the master session key. If the authentication is not successful, DSR 100 sends message 6B, which is a DEA message indicating an EAP authentication failure.

Thus, using these steps illustrated in FIGS. 4A and 4B, DSR 100 functions as an AAA proxy for SWa to SWx authentication and performs protocol interworking between the Diameter SWa and Diameter SWx interfaces. Additional details and variations of the EAP protocol are not illustrated in FIGS. 4A and 4B but can be found in the above-referenced RFCs for the EAP protocol.

Figure 5:
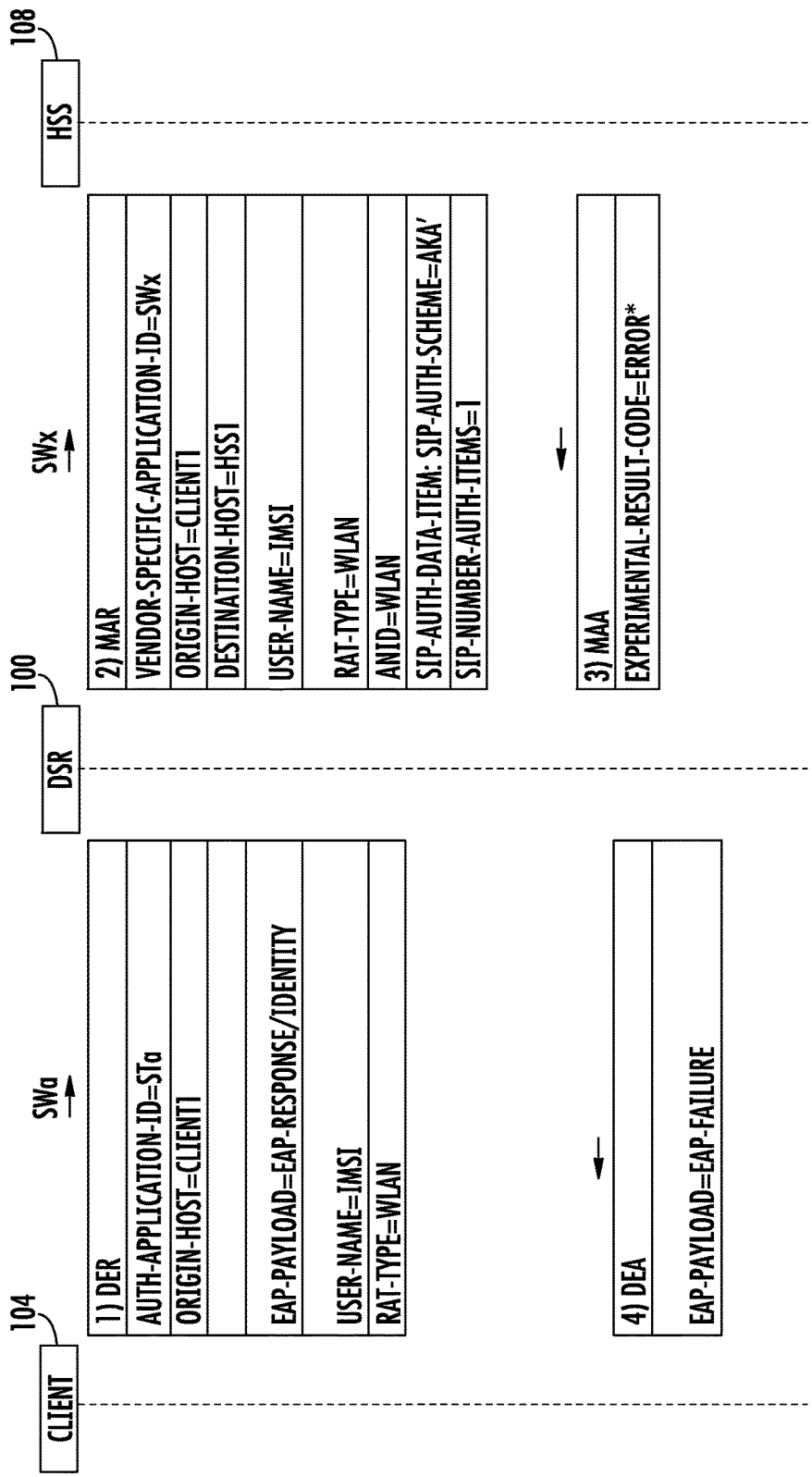
FIG. 5 is a message flow diagram illustrating protocol interworking and authentication proxying by a DSR between a Diameter SWa interface and a Diameter SWx interface where the authentication is rejected by a home subscriber server (HSS) according to an aspect of the subject matter described herein.

FIG. 5 is a message flow diagram illustrating exemplary messages exchanged for SWa to SWx authentication proxying and protocol interworking when HSS 108 rejects the authentication. In FIG. 5, message 1 and message 2 are the same as those illustrated in FIG. 4A. However, rather than sending a MAA message as message 3, which includes the authentication vectors, HSS 108 sends a result code indicating an error. Such a message may be sent if there is no record for the user in HSS 108. Upon receiving the MAA message, DSR 100 formulates a DEA message indicating an EAP authentication failure and sends the DEA message to client 104 over the SWa interface.

Figure 6A:
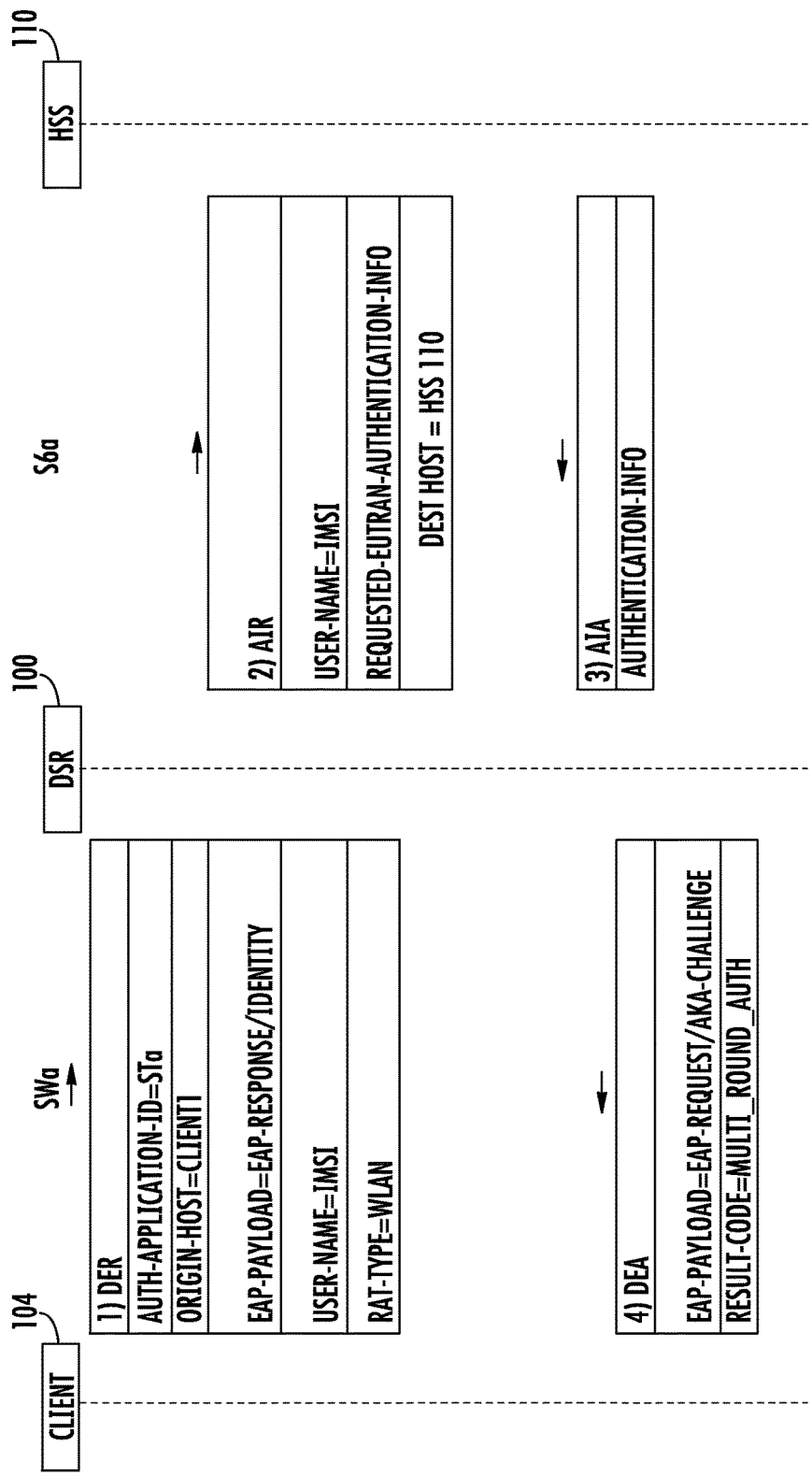
FIG. 6A is a message flow diagram illustrating protocol interworking and authentication proxying by a DSR between a Diameter SWa interface and a Diameter S6a interface according to an aspect of the subject matter described herein.

As stated above, another type of authentication proxying and protocol interworking that may be performed by DSR 100 is Diameter SWa (or STa, SWm) to Diameter S6a authentication proxying and protocol interworking. FIG. 6A is a message flow diagram illustrating exemplary SWa to S6a authentication proxying and protocol interworking by DSR 100. Not all AVPs may be shown in the messages. Referring to FIG. 4A, when a mobile device seeks access to a cellular network via a non-3GPP access network, client 104 sends message 1, which is a DER message, to DSR 100. The DER message is the same as that illustrated in FIG. 4A. In response to the DER message, DSR 100 performs an address resolution using the IMSI, identifies HSS 110 as the destination, and formulates and sends message 2, which is a Diameter Authentication Information Request (AIR) message, to HSS 110 over the S6a interface. The AIR message includes the IMSI and requests authentication information from HSS 110.

In response to receiving the AIR message, HSS 110 performs a lookup in its subscriber database using the IMSI to locate the authentication record for the subscriber. If the authentication record exists, HSS 110 formulates an Authentication Information Answer (AIA) message, including the requested authentication information. The authentication information includes authentication challenge information and expected response information. In response to receiving the AIA message, DSR 100 formulates and sends message 4, which is the Diameter DEA message that contains the authentication challenge information.

Figure 6B:
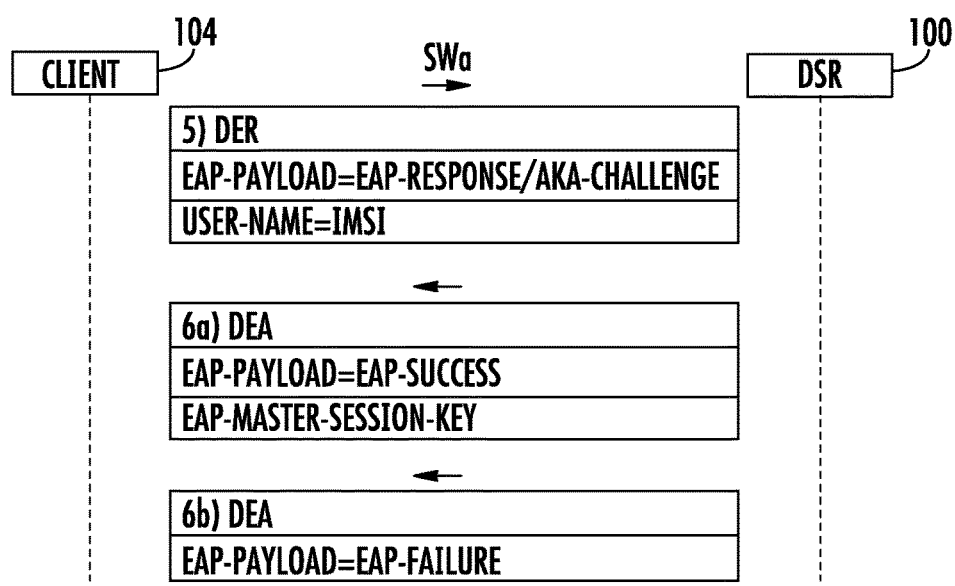
FIG. 6B is a continuation of the message flow illustrated in FIG. 6A.

Referring to FIG. 6B and continuing with the message flow in FIG. 4A, in response to receiving the DEA message, client 104 forwards the authentication challenge information to the mobile device seeking authentication. The mobile device computes a response to the challenge and sends the response back to client 104. In response to receiving the computed response, client 104 forwards a Diameter DER message including the computed response to DSR 100 and the SWa interface. DSR 100 determines whether the received response matches the stored response for the authentication challenge. If the received response matches the stored response, the authentication is successful. If the received response does not match the stored response, the authentication is unsuccessful. If the authentication is successful, DSR 100 sends a DEA message indicating successful authentication, as illustrated by message 6a. If the authentication fails, DSR 100 sends message 6b, which is a DEA message indicating authentication failure. Thus, using the steps illustrated in FIGS. 6A and 6B, DSR 100 performs address resolution and authentication proxying and protocol interworking between Diameter SWa and Diameter S6a interfaces.

Figure 7A:
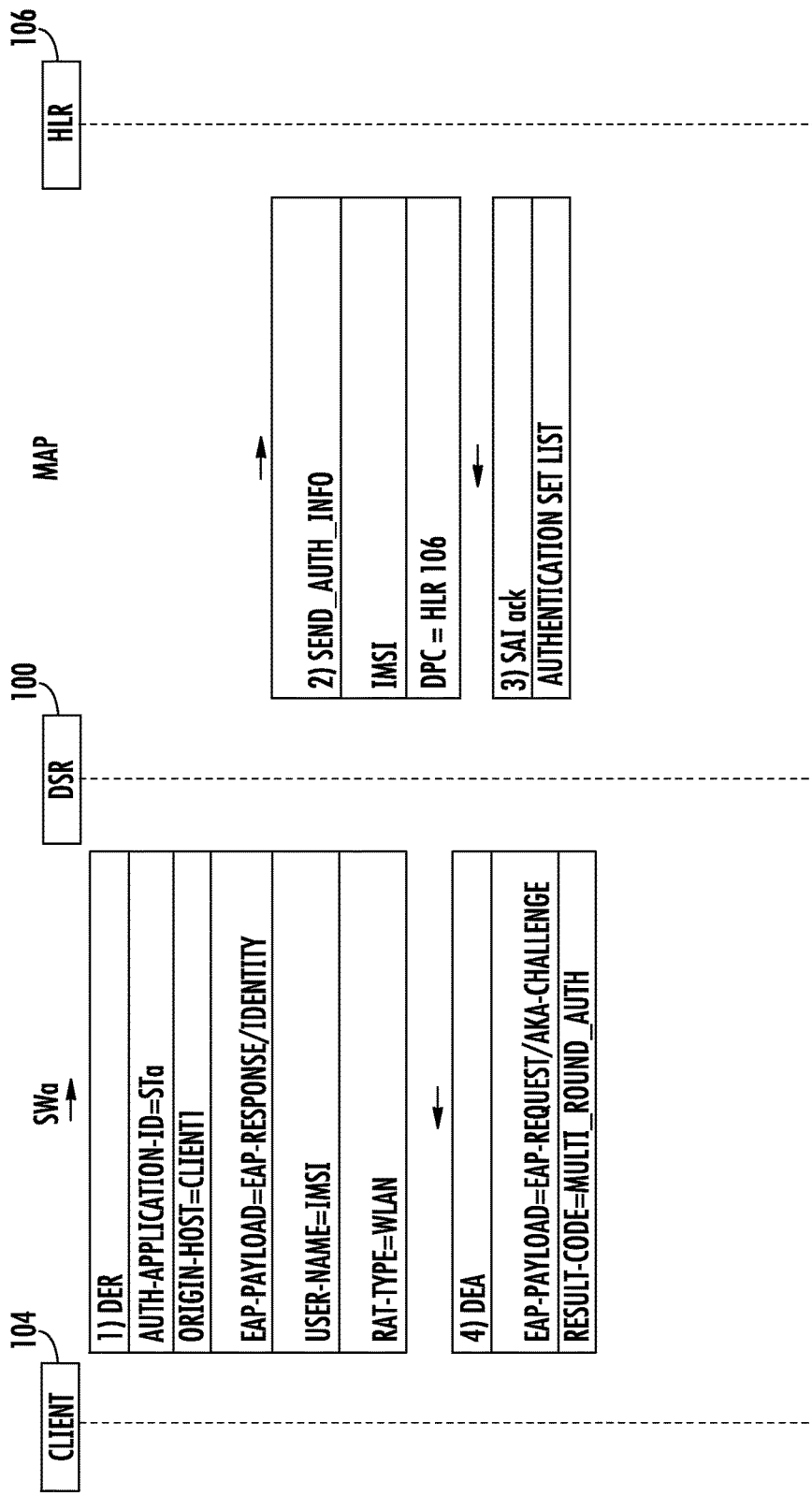
FIG. 7A is a message flow diagram illustrating protocol interworking and authentication proxying by a DSR between a Diameter SWa interface and an SS7 mobile application part (MAP) interface according to an aspect of the subject matter described herein.

Another type of authentication proxying and protocol interworking that may be performed by DSR 100 is authentication proxying and protocol interworking for Diameter SWa (or STa, SWm) to MAP. MAP is an SS7-based protocol used for mobility management, registration, and authentication in SS7 networks. FIG. 7A illustrates exemplary messages exchanged for Diameter SWa (or STa, SWm) to MAP authentication proxying and protocol interworking according to an aspect of the subject matter described herein. Not all AVPs or parameters may be shown in the messages. Referring to FIG. 7A, when a user seeks to access cellular network authentication servers from a non-3GPP network, client 104 sends a Diameter DER message to DSR 100 on the SWa interface. DSR 100, in response to receiving the DER message, performs an address resolution using the IMSI to identify HLR 106 as the destination and formulates and sends to HLR 106 a GSM MAP send authentication information (SAI) message. The SAI message includes the subscriber's IMSI and the point code of HLR 106 obtained in the address resolution.

In response to receiving the SAI message, HLR 106 performs a lookup in its subscriber database using the IMSI and locates an authentication record for the subscriber. HLR 106 then formulates and sends MAP SAI acknowledge message to DSR 100. The SAI acknowledge message includes authentication challenge information and expected response information.

Upon receiving the SAI acknowledge message, DSR 100 stores the expected response information and forwards the authentication challenge information to client 104 in an EAP payload carried in a DEA message.

Figure 7B:
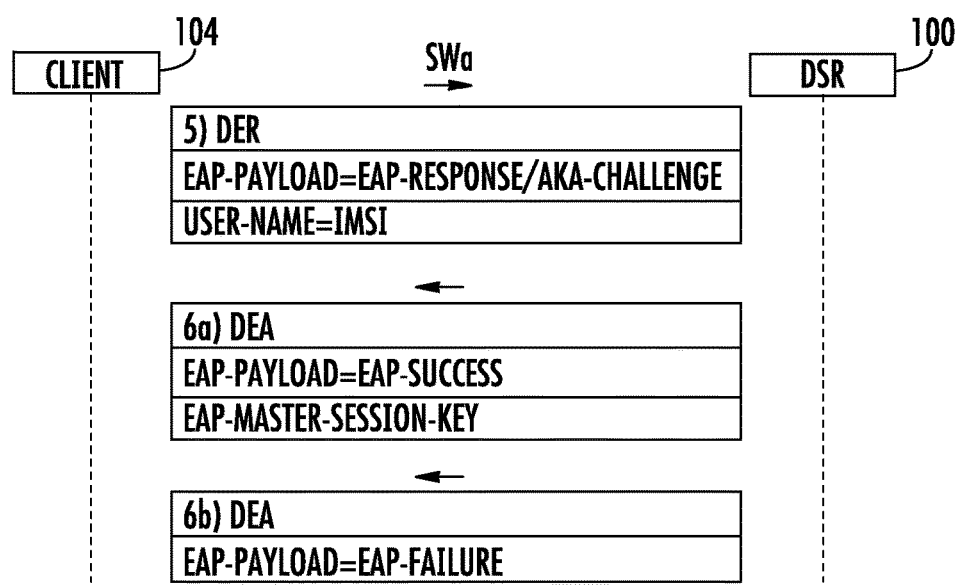
FIG. 7B is a continuation of the message flow diagram of FIG. 7A.

Referring to FIG. 7B, in response to receiving the DEA message, client 104 forwards the authentication challenge information to the mobile device seeking access to the network. The mobile device computes a response to the challenge and communicates the response to client 104. Client 104, in response to receiving the computed response from the mobile device, formulates and sends a Diameter EAP response message to DSR 100 including the response. DSR 100 compares the received response to the stored expected response. If the received response matches the expected response, DSR 100 formulates and sends message 6a, which is a DEA message indicating successful EAP authentication and including the master session key. If the authentication is not successful, DSR 100 formulates and sends message 6b, which is a DEA message indicating authentication failure and which does not include the master session key. Accordingly, as illustrated in FIGS. 7A and 7B, DSR 100 performs address resolution and authentication proxying and protocol interworking for SWa to MAP authentication.

Figure 8A:
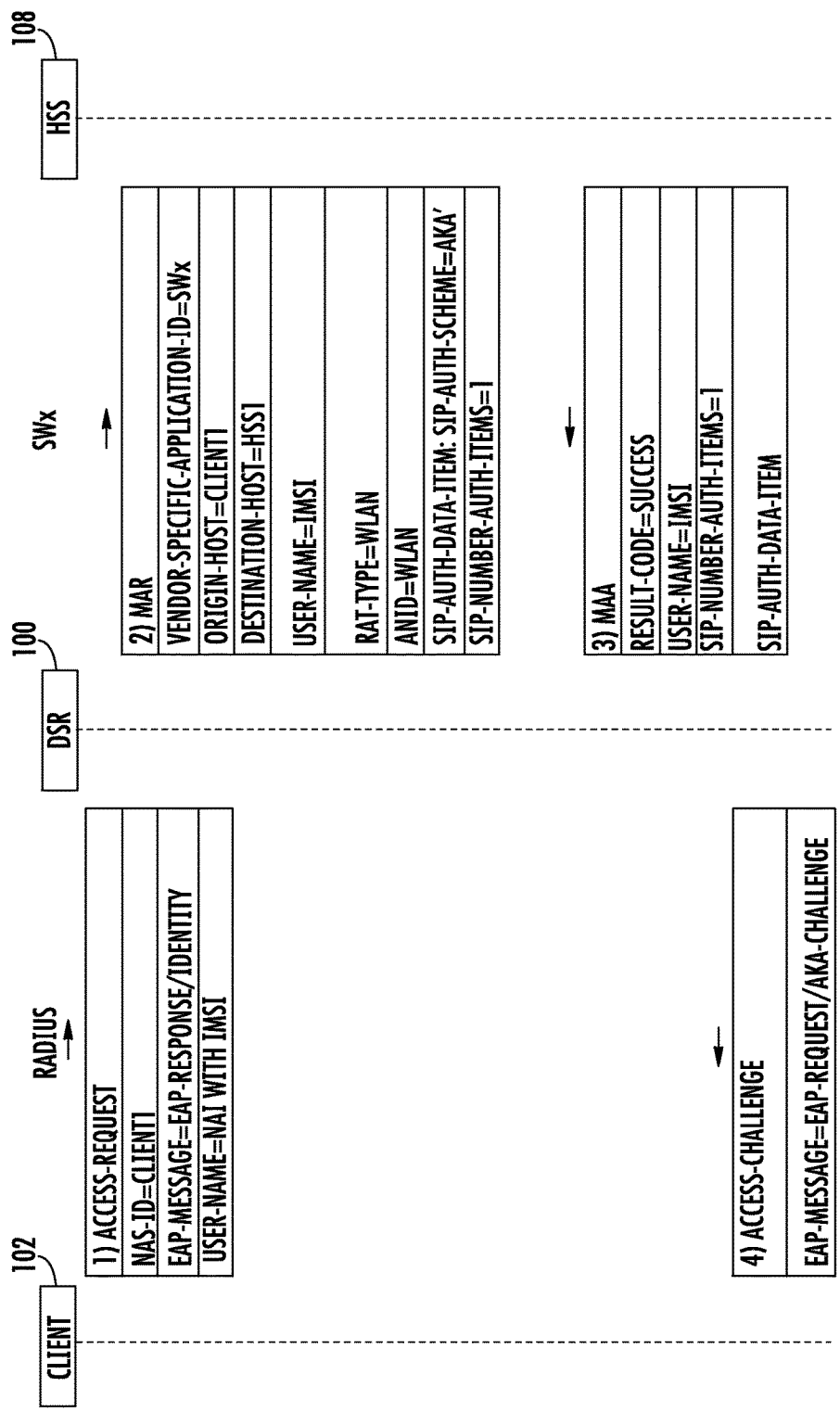
FIG. 8A is a message flow diagram illustrating protocol interworking and authentication proxying by a DSR between a RADIUS interface and a Diameter SWx interface according to an aspect of the subject matter described herein.

Another type of authentication proxying and protocol interworking that may be performed by DSR 100 is authentication proxying and protocol interworking between a RADIUS interface and a Diameter SWx interface. FIG. 8A illustrates an exemplary message flow for RADIUS to Diameter SWx interworking that may be performed by DSR 100. Not all AVPs or attributes may be shown in the messages. Referring to FIG. 8A, when a mobile device accesses an access network that uses RADIUS and seeks automatic SIM card authentication, client 102 may send a RADIUS access request message with an EAP payload to DSR 100. In response to receiving the access request message, DSR 100 performs address resolution using the IMSI to identify HSS 108 as the message destination, formulates a Diameter MAR message, and sends the message to HSS 108 on the SWx interface. The MAR message requests authentication challenge information.

In response to receiving the MAR message, HSS 108 performs a lookup in its subscriber database using the IMSI in the MAR message to locate a record corresponding to the mobile subscriber. In the illustrated example, HSS 108 locates the record and formulates and sends message 3, which is an MAA message that includes authentication vector(s), including an authentication challenge and expected result. HSS 108 sends the MAA message to DSR 100. DSR 100 terminates the Diameter MAA message and formulates a corresponding RADIUS access challenge message. The access challenge message includes an EAP payload with the challenge(s) to be delivered to the mobile device seeking authentication.

Figure 8B:
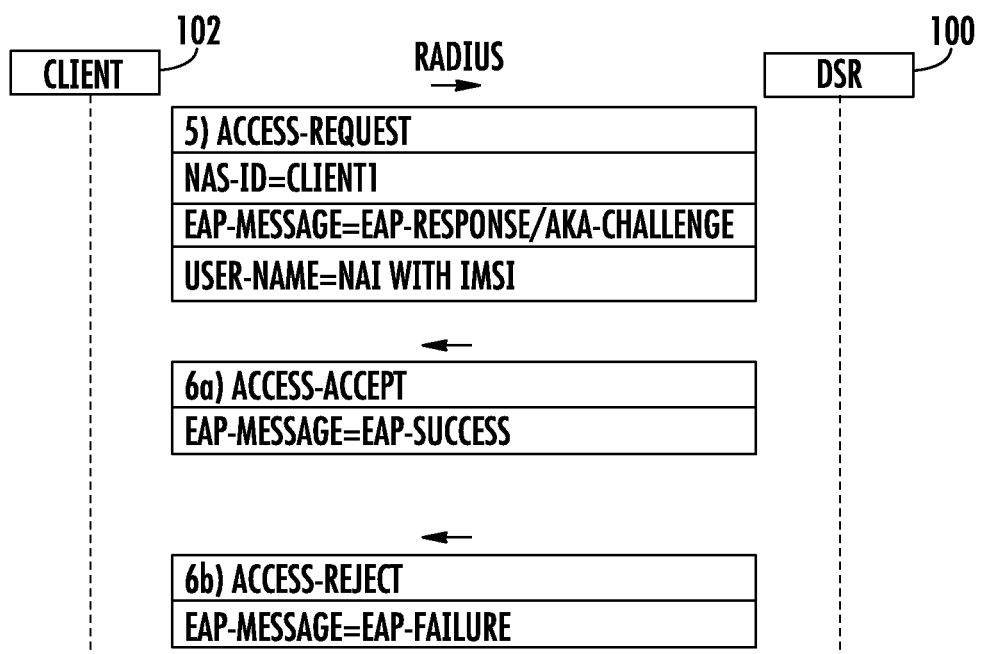
FIG. 8B is a continuation of the message flow diagram illustrated in FIG. 8A.

Referring to FIG. 8B, in response to receiving the RADIUS access challenge message, client 102 forwards the authentication challenge information to the mobile device seeking access to the network. The mobile device seeking access to the network formulates the challenge response and sends the challenge the response to client 102. Client 102 formulates message 5, which is a RADIUS access request message including the computed access challenge information. Client 102 sends the access request message to DSR 100. DSR 100 compares the challenge response in the access request message to the expected response. If the challenge response is equal to the expected response, DSR 100 formulates message 6A, which is a RADIUS access accept message with an EAP message indicating successful authentication. If the received response is not equal to the expected response, DSR 100 formulates and sends message 6B, which is a RADIUS access reject message indicating an authentication failure.

Figure 9A:
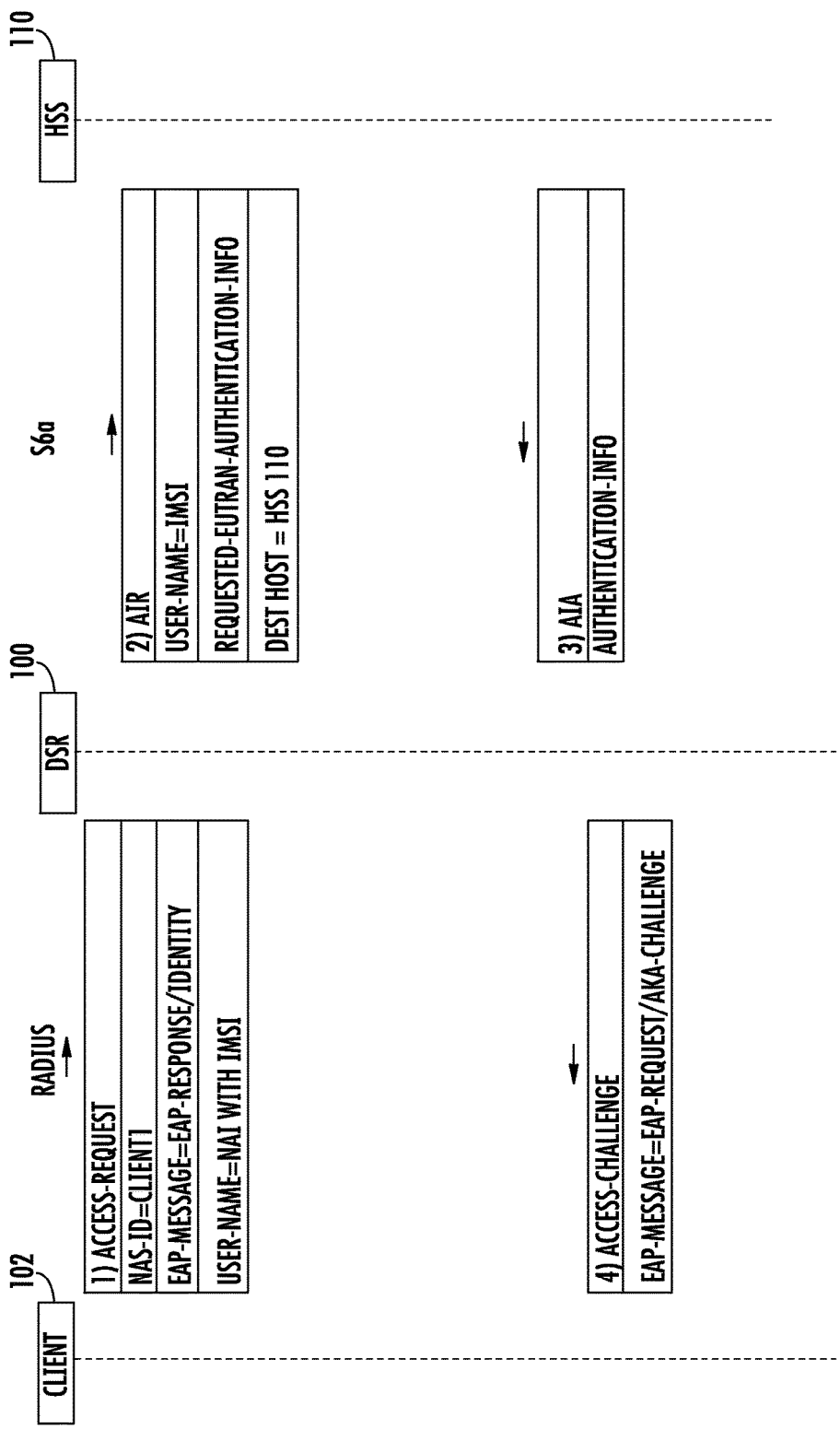
FIG. 9A is a message flow diagram illustrating protocol interworking and authentication proxying by a DSR between a RADIUS interface and a Diameter S6a interface according to an aspect of the subject matter described herein.

Yet another type of authentication proxying and protocol interworking that may be performed by DSR 100 is RADIUS to Diameter 56a authentication proxying and protocol interworking. FIG. 9A is a message flow diagram illustrating exemplary messages exchanged in performing RADIUS to Diameter 56a authentication interworking and protocol proxying according to an aspect of the subject matter described herein. Not all AVPs or attributes may be shown in the messages. Referring to FIG. 9A, when a mobile device seeks automatic SIM card authentication from an access network that uses RADIUS, the mobile device sends an authentication request to client 102. Client 102 formulates and sends a RADIUS access request message to DSR 100. In response to receiving the RADIUS access request message, DSR 100 performs an address resolution using the IMSI to identify HSS 110 as the destination and formulates and sends a Diameter AIR message to HSS 110 on the S6-a interface. In response to the AIR message, HSS 110 performs a lookup in its subscriber database to locate a record for the mobile subscriber. If the record is located, HSS 110 responds with message 3, which is a Diameter AIA message containing authentication vector(s). HSS 110 sends the Diameter AIA message to DSR 100. In response to receiving the Diameter AIA message, DSR 100 formulates and sends a RADIUS access challenge message including the challenge information and sends the message to client 102.

Figure 9B:
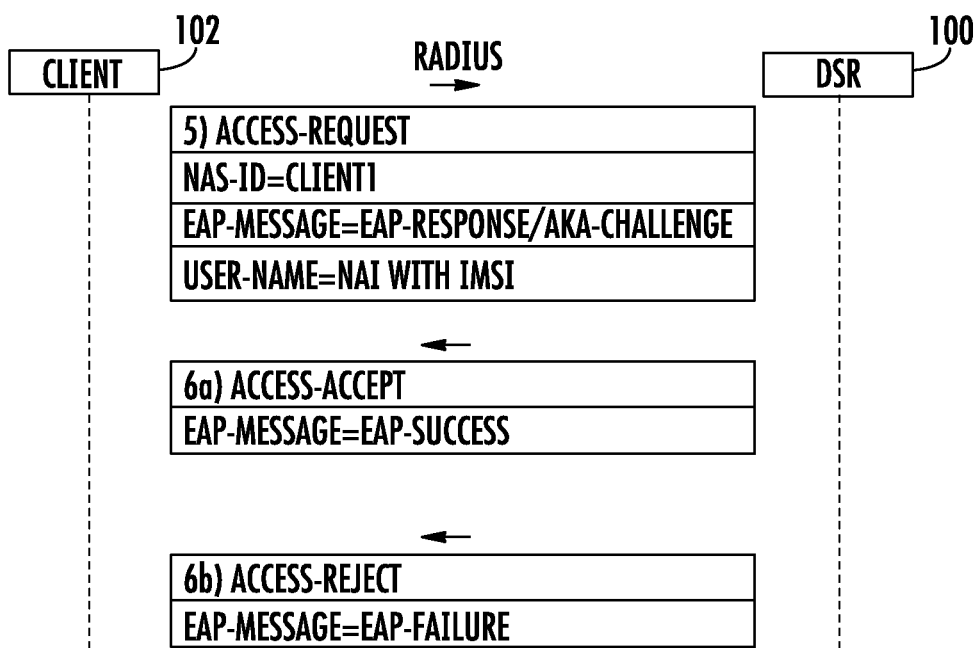
FIG. 9B is a continuation of the message flow diagram illustrated in FIG. 9A.

Referring to FIG. 9B, when client 102 receives the RADIUS access challenge message, client 102 sends the challenge information to the mobile device seeking authentication. The mobile device seeking authentication computes the challenge response and delivers the response to client 102. Client 102 formulates and sends message 5 to DSR 100. Message 5 is a RADIUS access request message including the computed challenge response information. DSR 100 compares the received challenge response with the stored challenge response. If the received challenge response is equal to the stored challenge response, DSR 100 responds with message 6A, which is a RADIUS access accept message indicating successful authentication. If the received authentication response does not match the stored response, DSR 100 formulates and sends message 6B, which is a RADIUS access reject message indicating authentication failure. Thus, DSR 100 functions as an AAA proxy and performs RADIUS to Diameter S6a protocol interworking.

Figure 10A:
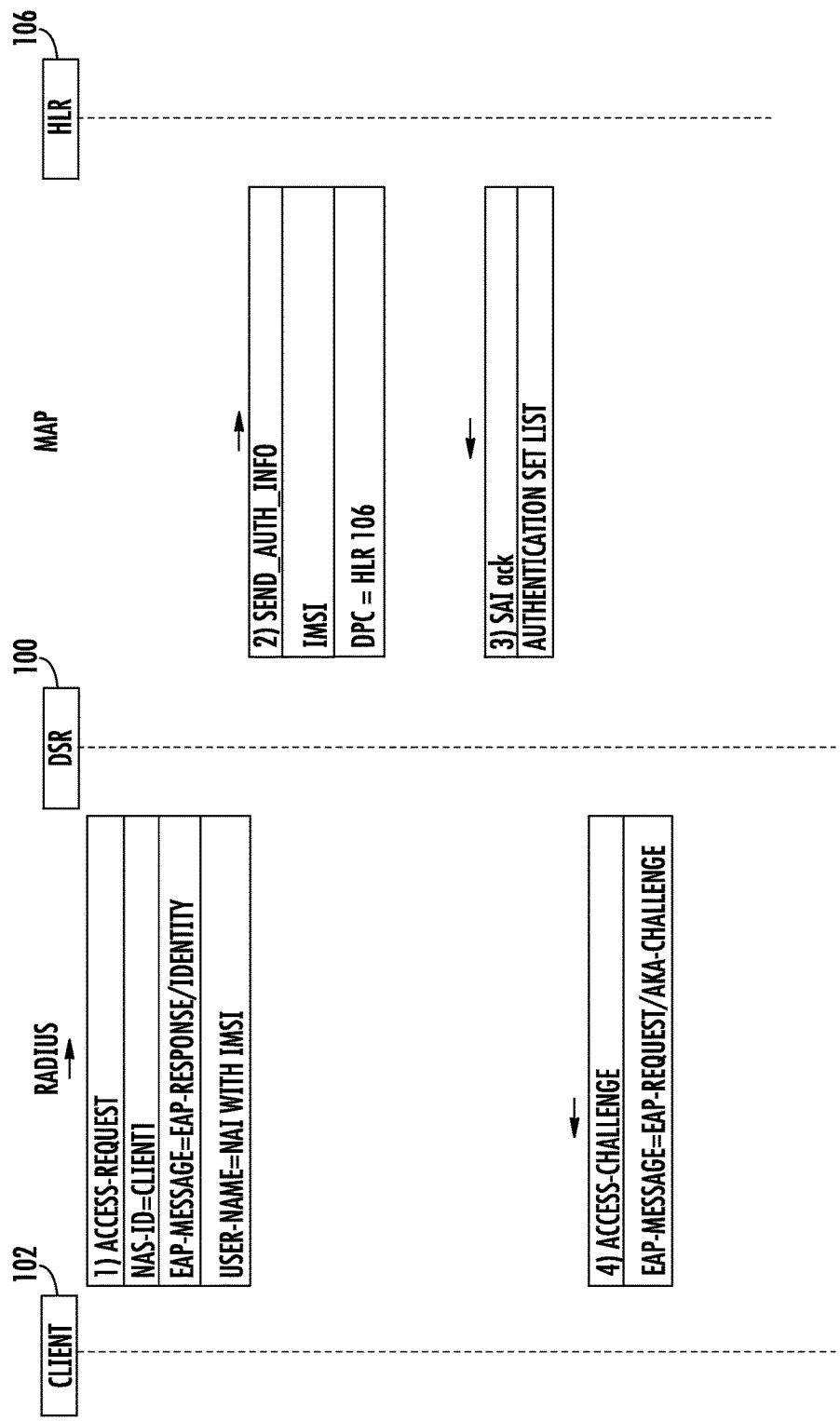
FIG. 10A is a message flow illustrating protocol interworking and authentication proxying by a DSR between a RADIUS interface and a MAP interface according to an aspect of the subject matter described herein.

Yet another type of authentication proxying and protocol interworking that may be performed by DSR 100 is RADIUS to SS7 MAP authentication proxying and protocol interworking. FIG. 10A illustrates exemplary messaging exchanged for RADIUS to SS7 MAP authentication proxying and protocol interworking. Not all attributes or parameters may be shown in the messages. Referring to FIG. 10A, when a mobile device accesses a network managed by client 102, client 102 sends a RADIUS access request message to DSR 100. The access request message may include information for identifying the subscriber. DSR 100 terminates the access request message, performs an address resolution using the IMSI to identify HLR 106 as the destination, and formulates and sends a MAP SAI message to HLR 106. Upon receiving the SAI message, HLR 106 performs a lookup in its subscriber database to locate a record corresponding to the subscriber seeking authentication. If a record exists, HLR 106 sends an SAI acknowledge message including authentication information to DSR 100. DSR 100 stores the expected response and sends a RADIUS access challenge message including the authentication challenge information to client 102.

Figure 10B:
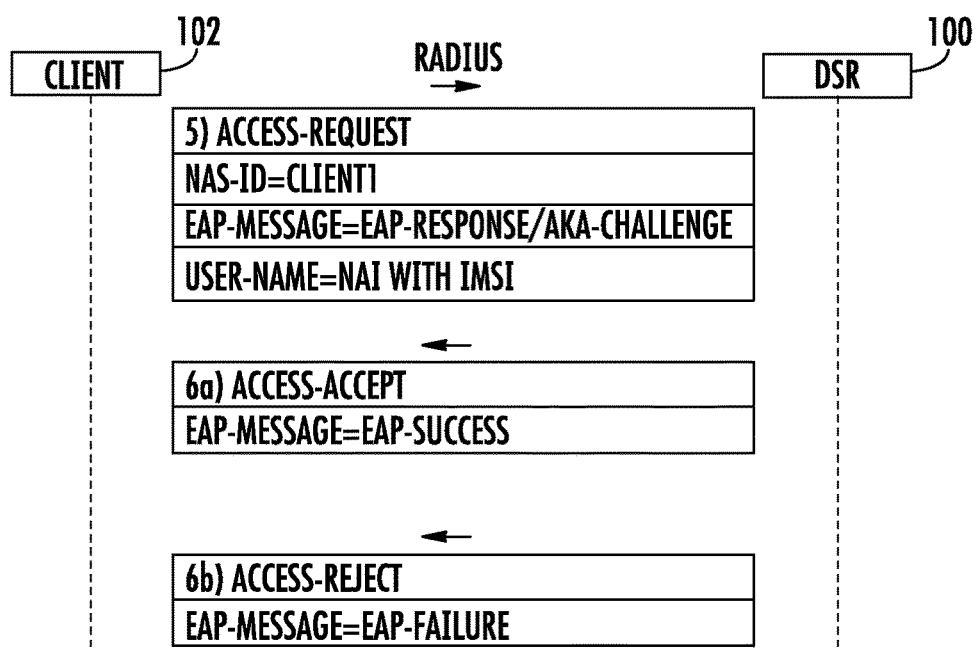
FIG. 10B is a continuation of the message flow illustrated in FIG. 10A.

Referring to FIG. 10B, when client 102 receives the access challenge information, client 102 provides the challenge information to the mobile device seeking authentication. The mobile device computes a response to the challenge and delivers the response to client 102. Client 102 inserts the response information in a RADIUS access request message and sends the message to DSR 100. DSR 100 compares the received response with the stored response. If the received response matches the stored response, DSR 100 responds with message 6A, which is a RADIUS access accept message. If the received access response does not match the stored response, DSR 100 responds with message 6B, which is a RADIUS access reject message indicating an authentication failure. Thus, DSR 100 according to an aspect of the subject matter described herein performs RADIUS to MAP authentication proxying and protocol interworking.

Figure 11:
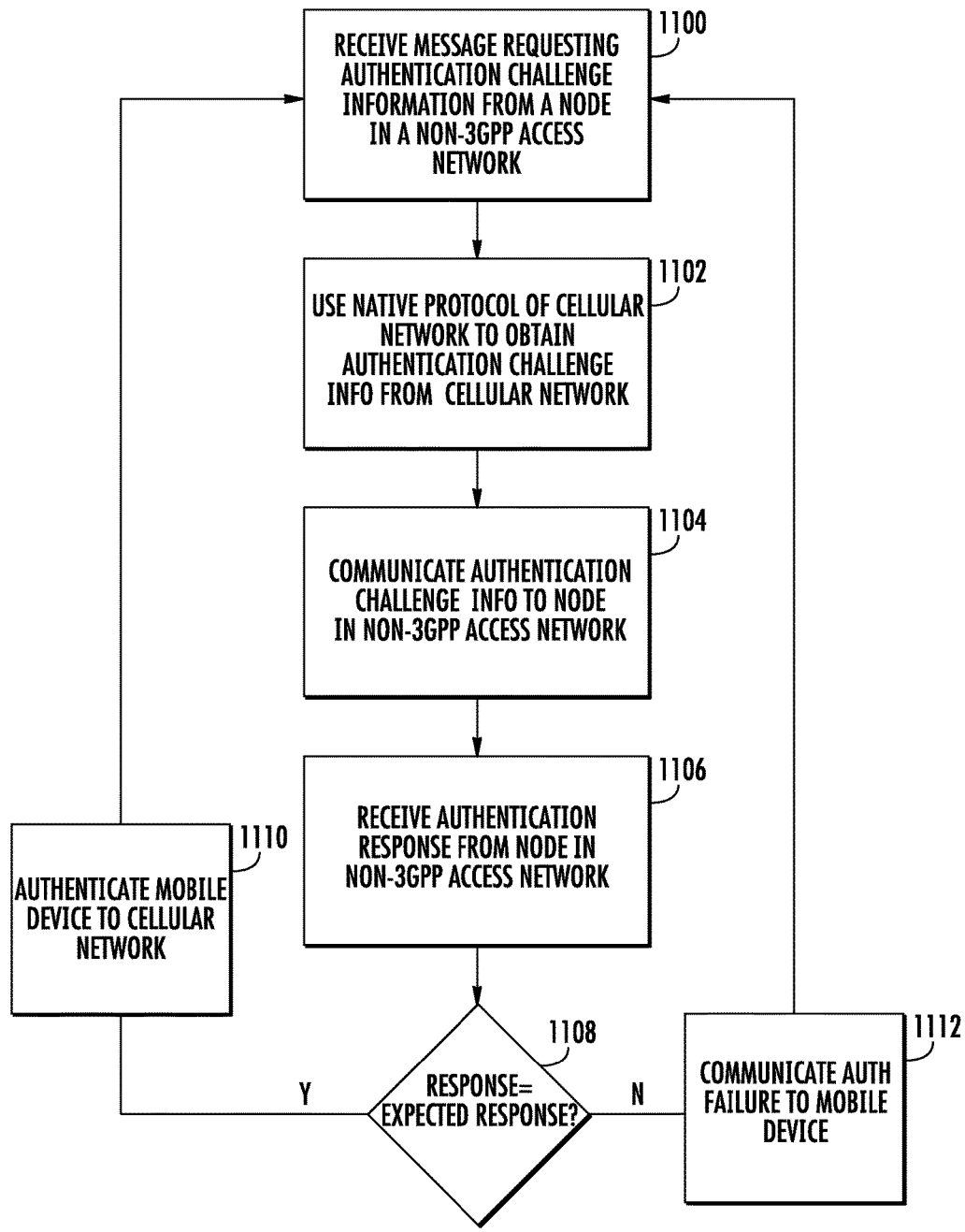
FIG. 11 is a flow chart illustrating an exemplary process for access network protocol interworking and authentication proxying according to an aspect of the subject matter described herein.

FIG. 11 is a flow chart illustrating an exemplary process for authentication proxying and protocol interworking according to an aspect of the subject matter described herein. Referring to FIG. 9 in step 1100, a message requesting authentication information is received. The message may originate from a node in a non-3GPP access network. The message may be received by DSR 100 and may be any of the types described above, e.g., RADIUS, Diameter, or other protocol. If the message is a Diameter protocol message, the message may be a Diameter SWa message, a Diameter STa message, or a Diameter SWm message.

In step 1102, the native protocol of the cellular network is used to obtain authentication challenge information from the cellular network. For example, DSR 100 may use Diameter or MAP signaling to obtain authentication challenge information from an HLR or an HSS. If Diameter signaling is used, the type of message used to communicate with the node in the cellular network may be a Diameter S6a message. The DSR may store the authentication challenge information as state information for the authentication session. Step 1102 may include performing address resolution to identify the destination for the outbound message.

In step 1104, the authentication challenge information is communicated to the node in the access network that sent the access request message. For example, DSR 100 may send a RADIUS, Diameter, or other protocol message to communicate the challenge information to the node in the access network. If the message is a Diameter protocol message, the message may be a Diameter SWa message, a Diameter STa message, or a Diameter SWm message.

The node in the access network may communicate the challenge information to the mobile device seeking authentication. The mobile device may compute the required challenge response and send the response to the access point or the client node. The client node may send this information to the DSR in an authentication response message. The authentication response message may be a RADIUS message or a Diameter protocol message, such as a Diameter SWa message, a Diameter STa message, or a Diameter SWm message. In step 1106, the DSR receives the authentication response from the node in the access network.

In step 1108, the DSR determines whether the response matches the expected response. Determining whether the response matches the expected response may include accessing the state information stored by the DSR for the authentication session and determining whether the state information matches the authentication response computed by the mobile device.

If the response matches the expected response, control proceeds to step 1110 where the DSR authenticates the mobile device to the cellular network by communicating the successful authentication to the device via the client. Control then returns to step 1100 for processing the next authentication request. If, on the other hand, the response does not equal the expected response, control proceeds to step 1112 where an indication of authentication failure is communicated to the mobile device. Control then proceeds to step 1100 to process the next authentication request. Thus, using these steps illustrated in FIG. 11, a DSR may perform address resolution for seamless authentication proxying and protocol interworking for a variety of different access network protocols and interfaces.

Address Resolution for Signaling Protocol Interworking for Authentication

As stated above, RADIUS proxy and Diameter agent address resolution may be performed for AAA authentication or accounting, where the AAA server uses RADIUS or Diameter. AAA authentication may be performed automatically where the user is authenticated to both the access network and a cellular network that allows the user to access cellular network services while connected to a trusted or untrusted access network. For example, authentication may be initiated by the SIM of the user device according to the EAP protocol, as described in any of the above-referenced EAP RFCs.

EAP payloads must be communicated between the client in the access network, such as a Wi-Fi access gateway, and an AAA server to authenticate users who connect to an access network to the cellular network. The EAP SIM protocol RFC specifies RADIUS as the protocol for communicating EAP payloads between nodes in the access network. However, cellular networks may utilize Diameter for communicating with the AAA server. In other access networks, Diameter may be used for authentication, while the cellular network may use RADIUS for authentication. Because RADIUS and Diameter are different protocols, interworking is required to authenticate users who connect to an access network that uses one protocol to communicate authentication information with a cellular network that uses a different protocol to communicate authentication information.

Figure 12:
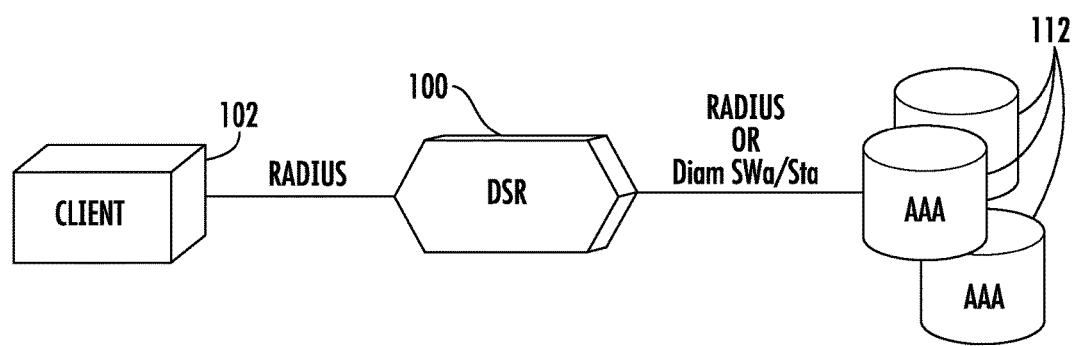
FIG. 12 is a network diagram illustrating a DSR including an interworking function (IWF) for access network signaling protocol interworking for user authentication according to an aspect of the subject matter described herein.

FIG. 12 is a network diagram illustrating DSR 100 signaling protocol interworking for authentication between an access network that uses RADIUS and a cellular network that uses Diameter or RADIUS to communicate with an AAA server. Referring to FIG. 12, when a user device connects to an access network via RADIUS client 102, RADIUS client 102 may communicate RADIUS messages carrying authentication payloads to DSR 100. In one example, RADIUS client 102 may be a Wi-Fi access gateway (WAG). DSR 100 may include an interworking function that converts between the RADIUS protocol and a Diameter protocol to communicate the authentication payloads to an AAA server 112 if AAA server 112 uses Diameter.

If AAA server 112 uses RADIUS, interworking may not be required. In either case, address resolution may be performed on the IMSI to identify which AAA server of plural AAA servers 112 contains the authentication record for the subscriber. If the outbound message is Diameter, a routable address for the identified AAA server may be inserted in the destination host parameter of the Diameter message, and the message may be routed to the identified AAA server. If the outbound message is RADIUS, the outbound message may be routed to the identified AAA server without modification, as RADIUS does not include a destination host parameter. The Diameter protocol used on the interface between DSR 100 and AAA server 112 may be a Diameter SWa protocol or a Diameter STa protocol. The Diameter STa protocol is used when the access network is trusted. The Diameter SWa protocol is used when the access network is untrusted.

Figure 13:
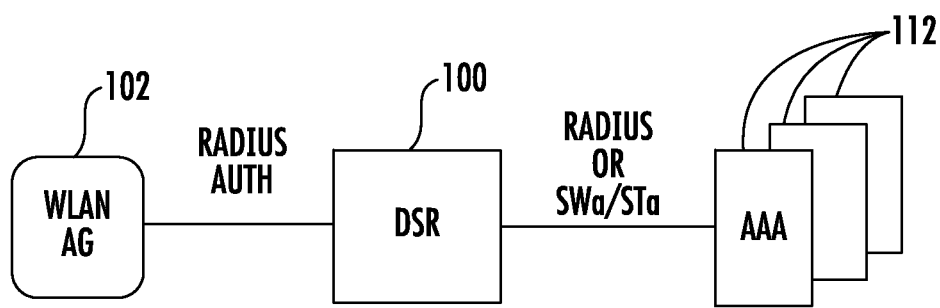
FIG. 13 is a network diagram illustrating a DSR with a RADIUS-Diameter IWF for RADIUS-Diameter interworking according to an aspect of the subject matter described herein.

FIG. 13 is a network diagram illustrating another example of address resolution for AAA authentication. In FIG. 13, DSR 100 include Diameter agent or RADIUS proxy address resolution and a RADIUS-Diameter IWF that performs the signaling protocol interworking between RADIUS authentication messages and Diameter SWa/STa authentication messages. If AAA servers 112 use RADIUS, the IWF may be omitted or bypassed. In the illustrated example, client 102 is a WLAN access gateway (AG). Such a gateway may be used by a Wi-Fi access network as an authentication gateway for user devices that attach to the access network. If client 102 uses RADIUS and AAA servers 112 use Diameter SWa or STa, the RADIUS-Diameter IWF of DSR 100 performs the interworking required for seamless authentication between the RADIUS and Diameter networks.

As stated above, Diameter SWa is one protocol used between an untrusted non-3GPP IP access network and a 3GPP AAA server or proxy. Diameter STa is used between a trusted non-3GPP IP access network or proxy and a 3GPP access network or proxy. SWa and STA share the same Diameter STa application ID. The decision as to whether the non-3GPP access is trusted or untrusted is made by the 3GPP AAA server during the access and authorization procedure and communicated to the non-3GPP access network.

Because DSR 100 may interface with both RADIUS and Diameter networks, DSR 100 includes internal components that perform the operations for Diameter-RADIUS protocol interworking. FIG. 3 is a block diagram illustrating exemplary components of DSR 100 that perform RADIUS to Diameter protocol interworking. An example of such components is illustrated above in FIG. 2. Returning to FIG. 2, R-D IWF 214 may perform the operations necessary for interworking between RADIUS and Diameter protocols when the inbound and outbound protocols are different. The remaining components illustrated in FIG. 2 may function as described above and a description thereof is not repeated herein.

Figure 14:
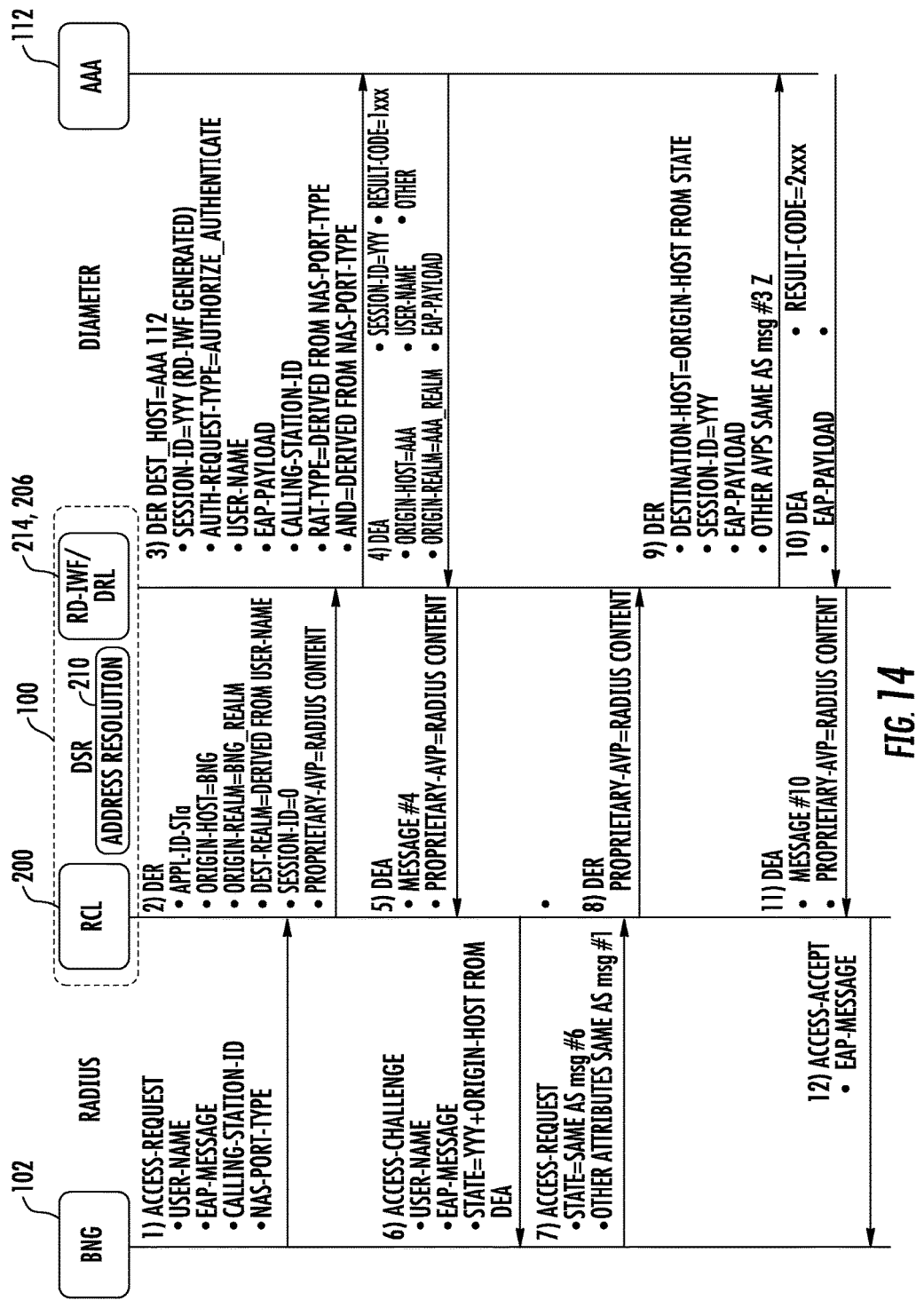
FIG. 14 is a message flow diagram illustrating exemplary message exchanges for RADIUS-Diameter interworking for user authentication where the inbound message type is RADIUS and the outbound message type is Diameter according to an aspect of the subject matter described herein.

One type of signaling protocol interworking that may be performed by DSR 100 is illustrated in FIG. 14. More particularly, FIG. 14 is a message flow diagram illustrating RADIUS-Diameter interworking when client 102 is a broadband network gateway (BNG) that uses RADIUS and AAA server 112 uses Diameter. The messages in FIG. 14 may include AVPs or parameters in addition to those shown in FIG. 14. Referring to FIG. 14, when a user device attaches to an access network that supports automatic authentication as described herein, the user device sends authentication credentials from its SIM to BNG 102. The user device may be a mobile device, such as a mobile handset, a tablet computer, or a laptop computer. Alternatively, the user device may be a non-mobile computer, such as a desktop personal computer. In response to receiving the authentication credentials, BNG 102 sends a RADIUS access request message to DSR 100. The RADIUS access request message includes the user name of the user seeking authentication, an EAP message, a calling station ID, and a NAS port type. When DSR 100 receives the RADIUS access request message, RCL 200 encapsulates the RADIUS access request message in a Diameter EAP request (DER) message. The DER message includes the application ID STa, an origin host parameter that identifies the BNG as the origin host, an origin realm parameter that identifies the BNG realm as the origin realm, a destination realm parameter that is derived from the username and that corresponds to the realm of AAA server 112, a session ID parameter equal to zero, and a proprietary AVP that identifies the DER message as carrying RADIUS content.

In response to receiving the RADIUS access request message, DRL 206 triggers address resolution module 210 to perform address resolution and R-D IWF 214 to perform RADIUS-Diameter interworking. Address resolution involves translating the IMSI in the received access request message to a routable destination address for AAA server 112 and inserting the routable address in the destination host parameter of the Diameter message. RADIUS-Diameter interworking includes formulating a DER message and mapping parameters from the RADIUS message to the DER message. Accordingly, R-D IWF 214 formulates message 3, which is a DER message. The DER message includes a destination host parameter identifying AAA server 112, a session ID parameter generated by R-D IWF 214, an authentication request type parameter specifying authorize authenticate, the user name, the EAP payload, the calling station ID, a remote access type (RAT)-type derived from the NAS port type, and an access network (AN) ID derived from the NAS port type. Once R-D IWF 214 formulates the DER message, R-D IWF passes the message to DRL 206, which routes the DER message to AAA server 112.

Upon receiving the DER message, AAA server 112 performs a lookup in its subscriber database using user ID information extracted from the EAP payload. In this example, it is assumed that AAA server 112 locates a record for the subscriber and obtains EAP access challenge information from the record. Accordingly, AAA server 112 formulates message 4, which is a Diameter EAP answer (DEA) message. The DEA message identifies AAA server 112 as the origin host. The origin realm parameter is set to the realm of AAA server 112. The session ID parameter mirrors the session ID received in the DER message (message 3). The user name is set to the user name value received in the DER message. The EAP payload contains the authentication challenge information. The result code in this example indicates that an authentication record was successfully located. If an authentication record did not exist for the subscriber, the result code would indicate an authentication error or subscriber not found.

DSR 100 receives the DEA message. DRL 206 triggers R-D IWF 214 to perform Diameter to RADIUS mediation for the received DEA message. R-D IWF 214 determines based on the message type and the message destination that the egress protocol is RADIUS and sends the message to RCL 200. The message sent to RCL 200 may be the received DEA message with an added parameter identifying the DEA message as carrying RADIUS content. RCL 200 receives the DEA message and formulates message 6, which is a RADIUS access challenge message. The RADIUS access challenge message includes the user name, the EAP message from AAA server 112, the session ID for the authentication session assigned by R-D IWF 214. The DEA message also includes an origin host parameter identifying the origin host as AAA server 112. RCL 200 forwards the access challenge message to BNG 102.

Upon receiving the RADIUS access challenge message, BNG 102 forwards the authentication challenge information to the user device seeking authentication. The user device provides the challenge response information to BNG 102. BNG 102 formulates and sends message 7, which is a RADIUS access request message, to RCL 200. The access request message contains the same state as the access challenge message and the other attributes specified in message 1. The EAP payload in the access request message may carry the access challenge information.

Upon receiving the access request message, DSR 100 provides the message to RCL 200, which encapsulates the access request message in message 8, which is a Diameter DER message with the proprietary parameter identifying the message as containing RADIUS content. DRL 206 triggers R-D IWF 214 to process the DER message. R-D IWF 214 formulates message 9, which is a Diameter DER message.

The Diameter DER message includes a destination host parameter obtained from a state AVP parameter, which DSR 100 sends to BNG 102 and BNG 102 echoes back. In this example, the destination host parameter would identify AAA server 112 as the destination host for the DER message. The session ID is the DER message is set to the session ID for the authentication session. The DER message includes the EAP payload, including the challenge response information from the user device. The other AVPs in the DER message may be the same as those in message 3. R-D IWF 214 may forward the DEA message to DRL 206, which routes the DER message (message 10) to AAA server 112.

Upon receiving the DER message, AAA server 112 extracts the EAP payload from the message, determines whether the authentication response information in the EAP payload matches the expected response, and determines an authentication result (i.e., successful or unsuccessful authentication). In this example, it is assumed that the authentication is successful. Accordingly, AAA server 112 formulates message 10, which is a DEA message, including a result code indicating successful authentication. The DEA message may also include an EAP payload and other parameters. AAA server 112 forwards the DEA message to DSR 100.

Upon receiving the DEA message, DRL 302 triggers R-D IWF 214 to perform a full translation of the DEA message. R-D IWF 214 determines that the message is destined to a RADIUS destination, so R-D IWF 214 forwards the DEA message to RCL 200 for transmission of the corresponding RADIUS message. The DEA message may include a parameter indicating that the message carries RADIUS content. RCL 200 receives the DEA message, formulates a RADIUS access accept message including the EAP payload from the DEA message and forwards the access accept message to BNG 102. BNG 102 then informs the user device that authentication was successful. Thus, using the steps illustrated in FIG. 14, a user device can be seamlessly authenticated to a core network that uses Diameter.

Table 4 shown below illustrates exemplary parameter mapping between a RADIUS access request message and a Diameter DER message that may be performed by R-D IWF 214.

TABLE 4

RADIUS Access Request to Diameter DER Parameter Mappings

| Diameter AVP | Value | SWa | STa | Notes |
| --- | --- | --- | --- | --- |
| Destination-Host | Blank if State not present in Access-Request. Taken from value of State if present in Access-Request. | O | O | Needed in non-initial Access-Request messages in order to ensure they are routed to same AAA server. |
| Session-ID | Generated by DSR if State not present in Access-Request. Taken from value of State if present in Access-Request. | M | M | Must be same value for the life of the authentication session. |
| Auth-Application-ID | STa | M | M | Used by both STa and SWa. |
| Auth-Request-Type | AUTHORIZE_AUTHENTICATE | M | M | |
| EAP-Payload | RADIUS EAP-Message attribute | M | M | |

TABLE 4-continued

RADIUS Access Request to Diameter DER Parameter Mappings

| Diameter AVP | Value | SWa | STa | Notes |
| --- | --- | --- | --- | --- |
| User-Name | RADIUS User-Name attribute | M | M | |
| Calling-Station-ID | RADIUS Calling-Station-ID | M | M | |
| RAT-Type | RADIUS NAS-Port-Type | C | M | |
| ANID | Mapped from RADIUS NAS-Port-Type | O | M | Included if access net selects EAP-AKA' authentication (most likely). |

In Table 4, values for Diameter AVPs formulated based on a received RADIUS access request message are illustrated. In the Table "O" stands for optional and "M" stands for mandatory.

Table 5 shown below illustrates exemplary values for RADIUS attributes that may be populated from a received Diameter message.

TABLE 5

Diameter DER AVPs for RADIUS Access Challenge Accept or Reject Message

| RADIUS attribute | Value | Notes |
| --- | --- | --- |
| User-Name | Diameter User-Name AVP | |
| EAP-Message | EAP-Payload | |
| State | Diameter Session-ID + Origin-Host (of AAA server) | |
| Message-Authenticator | Added if configured by user | RFC 3579 says this is mandatory in RADIUS message for EAP |

Figure 15:
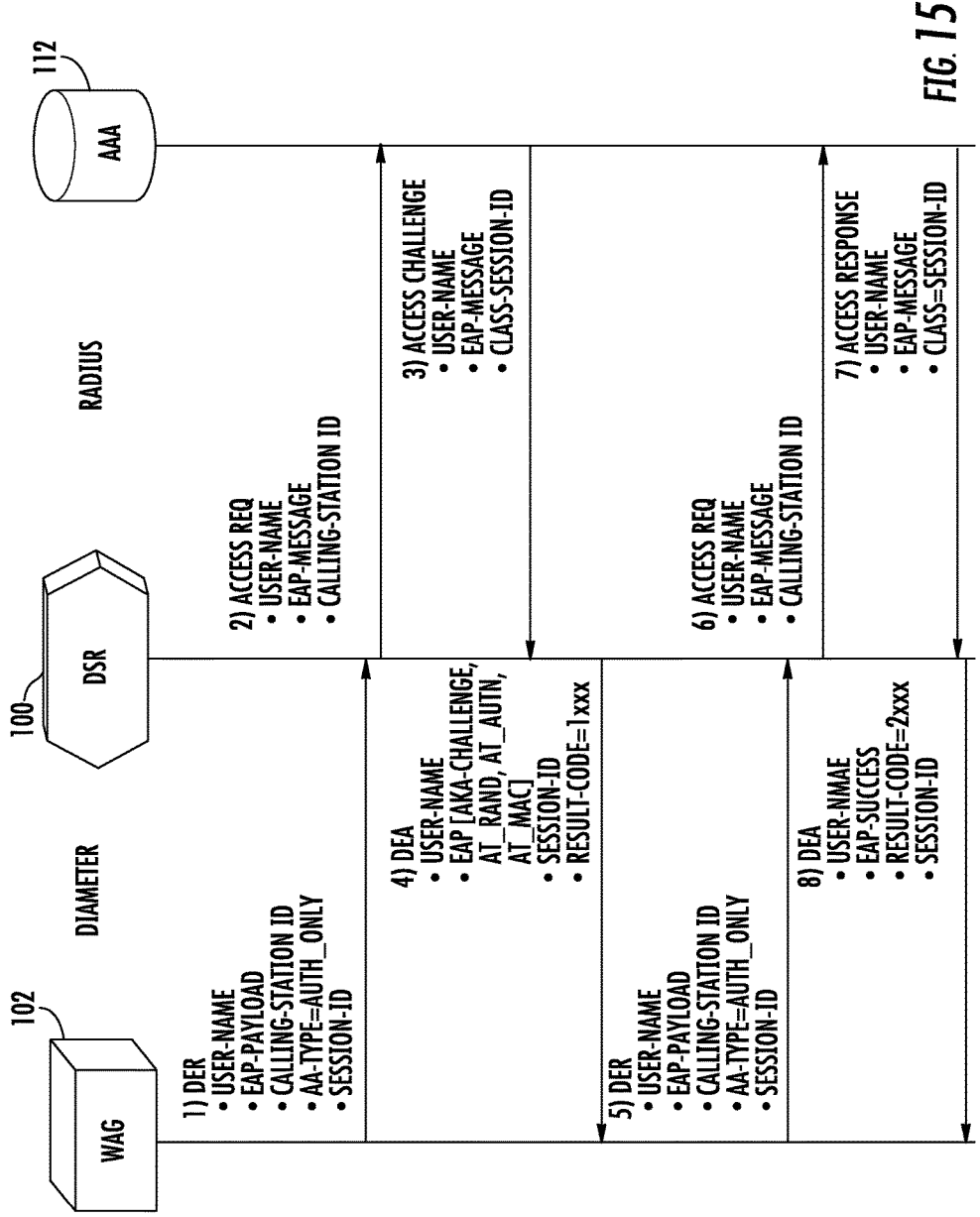
FIG. 15 is a message flow diagram illustrating exemplary message exchanges for Diameter-RADIUS interworking for user authentication where the initial inbound message type is Diameter and the outbound message type is RADIUS according to an aspect of the subject matter described herein.

In FIG. 14, DSR 100 performs signaling protocol interworking when the access network protocol is RADIUS and the cellular or core network protocol is Diameter. DSR 100 may also perform access network protocol interworking for authentication when the access network protocol is Diameter and the core network protocol is RADIUS. FIG. 15 illustrates such an example. Referring to FIG. 15, a wireless access gateway may initiate authentication with an AAA server when a user device connects to the access network that supports automatic authentication as described herein. Accordingly, wireless access gateway 102 formulates message 1 which is a DER message. The DER message includes the user name, an EAP payload, the calling station ID, an AA type parameter set to authentication only, and a session identifier. It should be noted that the messages illustrated in FIG. 15 may include other AVPs or parameters in addition to those illustrated. WAG 102 sends the DER message to DSR 100.

DSR 100 receives the DER message and, because the cellular network protocol is RADIUS, formulates message 2, which is a RADIUS access request message. The RADIUS access request message includes the user name, the EAP payload from the DER message, and the calling station ID. DSR 100 may perform an address resolution to identify the appropriate AAA server 112. DSR 100 forwards the access request message to AAA server 112.

AAA server 112 receives the access request message and uses the calling station ID to perform a lookup in its subscriber database. In this example, it is assumed that AAA server 112 locates a record corresponding to the calling station. Accordingly, AAA server 112 formulates message 3, which is a RADIUS access challenge message. The access challenge message includes the user name, an EAP payload, and a session identifier. The EAP payload may include access challenge information. AAA server 112 sends the access challenge message to DSR 100.

DSR 100 receives the RADIUS access challenge message, determines that the outbound message should be a Diameter message, and formulates message 4, which is a Diameter DEA message. The DEA message includes the user name, an EAP payload including the access challenge information, the session identifier, and a result code that indicates whether the authentication lookup was successful. DSR 100 forwards the DEA message to WAG 102.

WAG 102 receives the DEA message, removes the access challenge information, and provides the access challenge information to the user device seeking authentication. The user device sends access challenge response to information to WAG 102. WAG 102 formulates a Diameter DER message including EAP payload that carries the challenge response information. The DER message also includes a user name, the calling station ID, an AA type parameter set to authentication only, and a session identifier. WAG 102 sends the DER message to DSR 100.

DSR 100 receives the DER message, determines that the outbound message should be a RADIUS message, and formulates message 6, which is a RADIUS access request message. The RADIUS access request message includes the EAP payload with the challenge response information, a user name, and a calling station ID. DSR 100 forwards the access request message to AAA server 112.

AAA server 112 receives the access request message, performs a lookup in its database to determine whether the challenge response information is equal to an expected response, and formulates a message 7, which is a RADIUS access response message. The RADIUS access response message includes an EAP payload that indicates results of the authentication, a user name, and the session ID. AAA server 112 sends the access response message to DSR 100.

DSR 100 receives the access response message, determines that the outbound message should be a Diameter message, and formulates a Diameter DEA message. The DEA message includes an EAP payload indicating successful authentication and a result code also indicating successful authentication. The DEA message also includes a user name and a session identifier. DSR 100 sends the DEA message to WAG 102.

WAG 102, upon receiving the DEA message, communicates with the user device to indicate that the authentication to the network is successful. After successful authentication, the user device can access the wireless access network as well as core network services.

Figure 16:
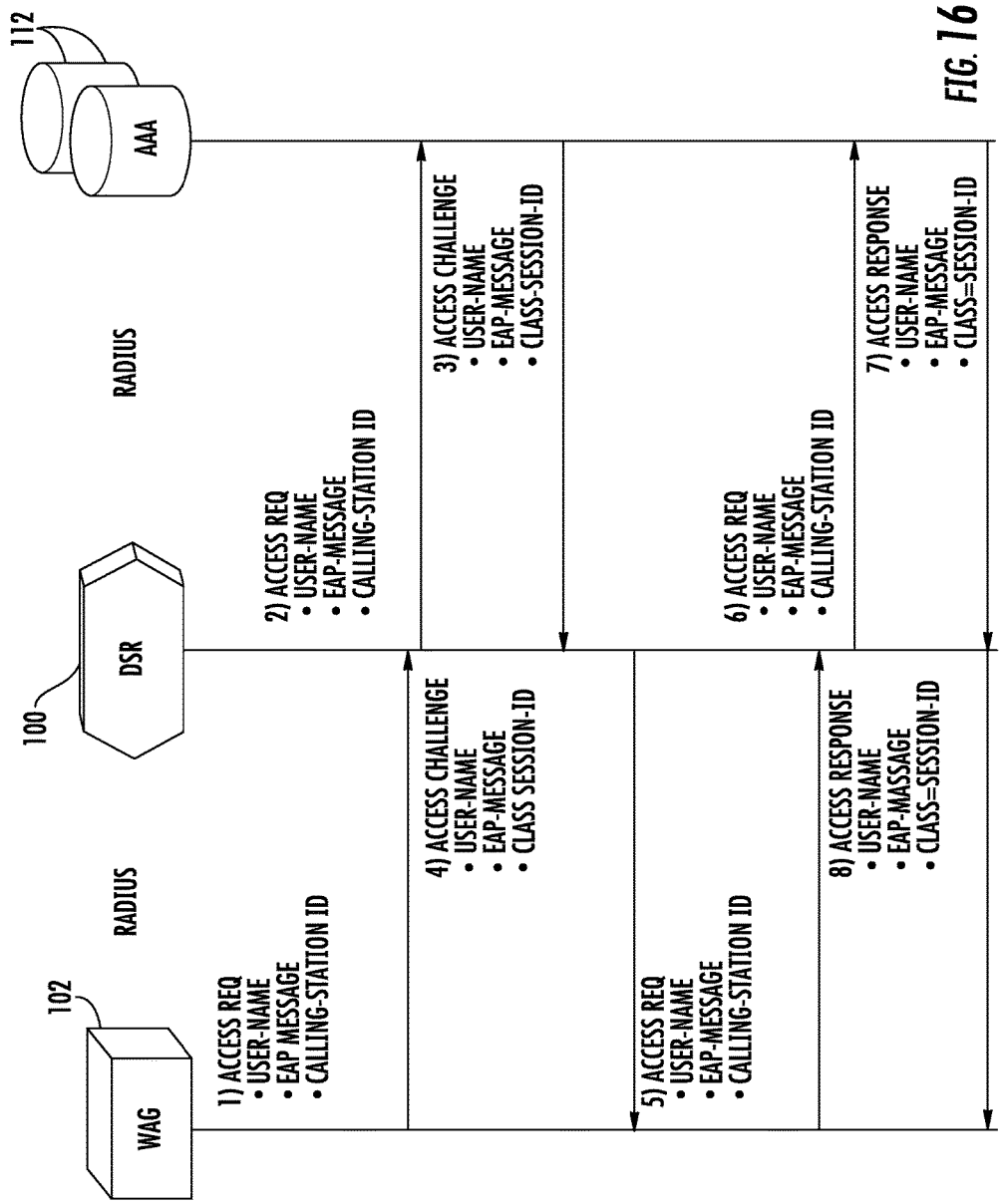
FIG. 16 is a message flow diagram of a DSR implementing RADIUS proxy address resolution where the inbound and outbound message types are RADIUS according to an aspect of the subject matter described herein.

As stated above, DSR 100 may perform address resolution when the inbound and outbound protocol messages are RADIUS. FIG. 16 illustrates such a case. In FIG. 16, wireless access gateway sends a RADIUS access request message to DSR 100. DSR 100 performs an address resolution based on the IMSI in the message and determines which of plural destination AAA servers 112 are to receive the message. DSR 100 sends the access request message 100 as message 2 to the identified AAA server 112. AAA server 112 formulates an access challenge message and sends the message to DSR 100. DSR 100 forwards the access challenge message to wireless access gateway 102.

In message 5, wireless access gateway 102 formulates a RADIUS access request message including the calling station I.D. DSR 100 performs an address resolution for the message and identifies which AAA server 112 should receive the message. DSR 100 routes the access request message as message 6 to the identified AAA server. AAA server 112 formulates an access response message to the access request message and sends the message to DSR 100. DSR 100 forwards the access response message as message 8 to wireless access gateway 102. Thus, DSR 100 is capable of performing address resolution for received RADIUS authentication messages when the outbound message is a RADIUS authentication message.

Figure 17:
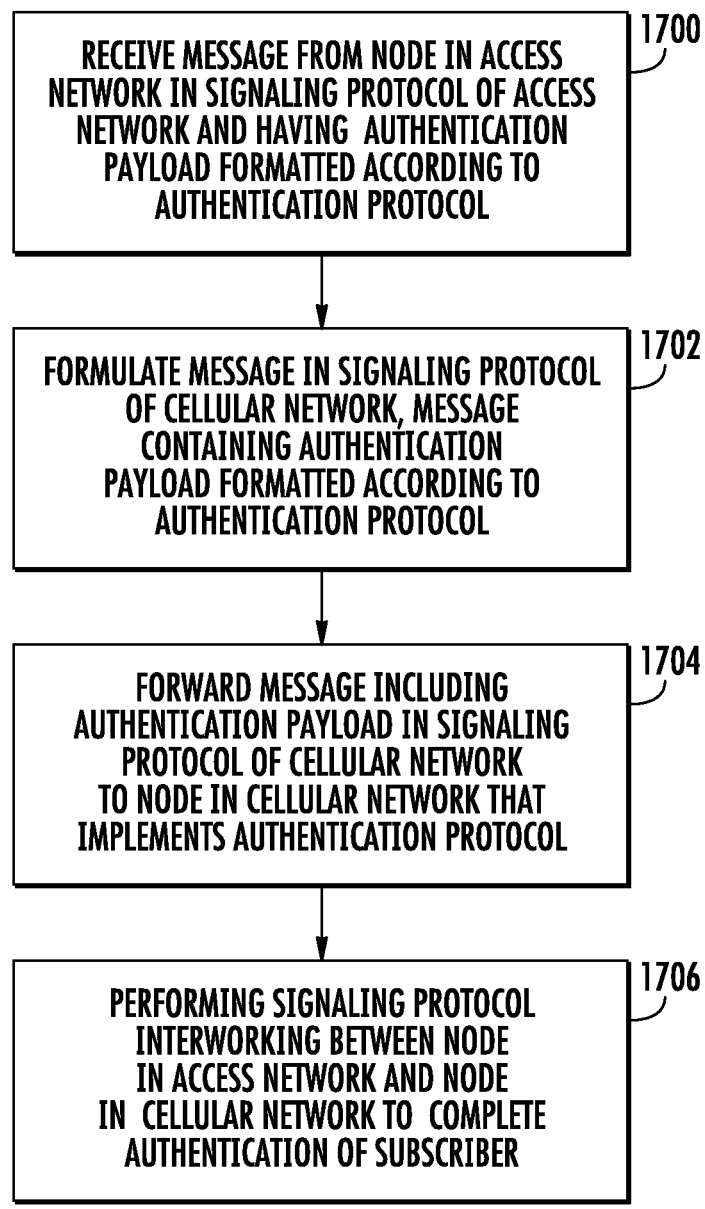
FIG. 17 is a flow chart illustrating an exemplary access network signaling protocol interworking for user authentication according to an aspect of the subject matter described herein.

FIG. 17 is a flow chart illustrating an exemplary process for access network signaling protocol interworking for user authentication according to an aspect of the subject matter described herein. Referring to FIG. 17, in step 1700, a message is received from a node in an access network. The message may be formatted in the signaling protocol of the access network and may include an authentication payload formatted according to an authentication protocol. For example, DSR 100 may receive a RADIUS message or a Diameter message including an EAP payload. In step 1702, a message is formulated in the signaling protocol of a cellular network, where the message contains the authentication payload formatted according to the authentication protocol. For example, DSR 100 may forward a RADIUS or Diameter message, depending on the protocol used by the cellular network. The RADIUS or Diameter message may include the EAP payload from the received Diameter or RADIUS message. As part of forwarding the received message, DSR 100 may perform an address resolution for the message.

In step 1704, a message including the authentication payload and in the signaling protocol of the cellular network is forwarded to a node in the cellular network that implements the authentication protocol. For example, DSR 100 may forward a RADIUS or Diameter message with the EAP payload to AAA server 112.

In step 1706, protocol interworking is performed between the node in the access network and the node in the cellular network to complete authentication of a subscriber according to the authentication protocol. For example, DSR 100 may convert between Diameter and RADIUS for subsequent message exchanges relating to authenticating a subscriber to the network. The authentication protocol may be any suitable authentication protocol, for example, EAP. Examples of such exchanges are illustrated in FIGS. 14 and 15.

In one exemplary implementation, the authentication protocol is implemented end to end between the node in the access network and the node in the cellular network. As a result, DSR 100 may perform the signaling protocol interworking to authenticate a subscriber while remaining stateless with respect to the authentication protocol.

Figure 18:
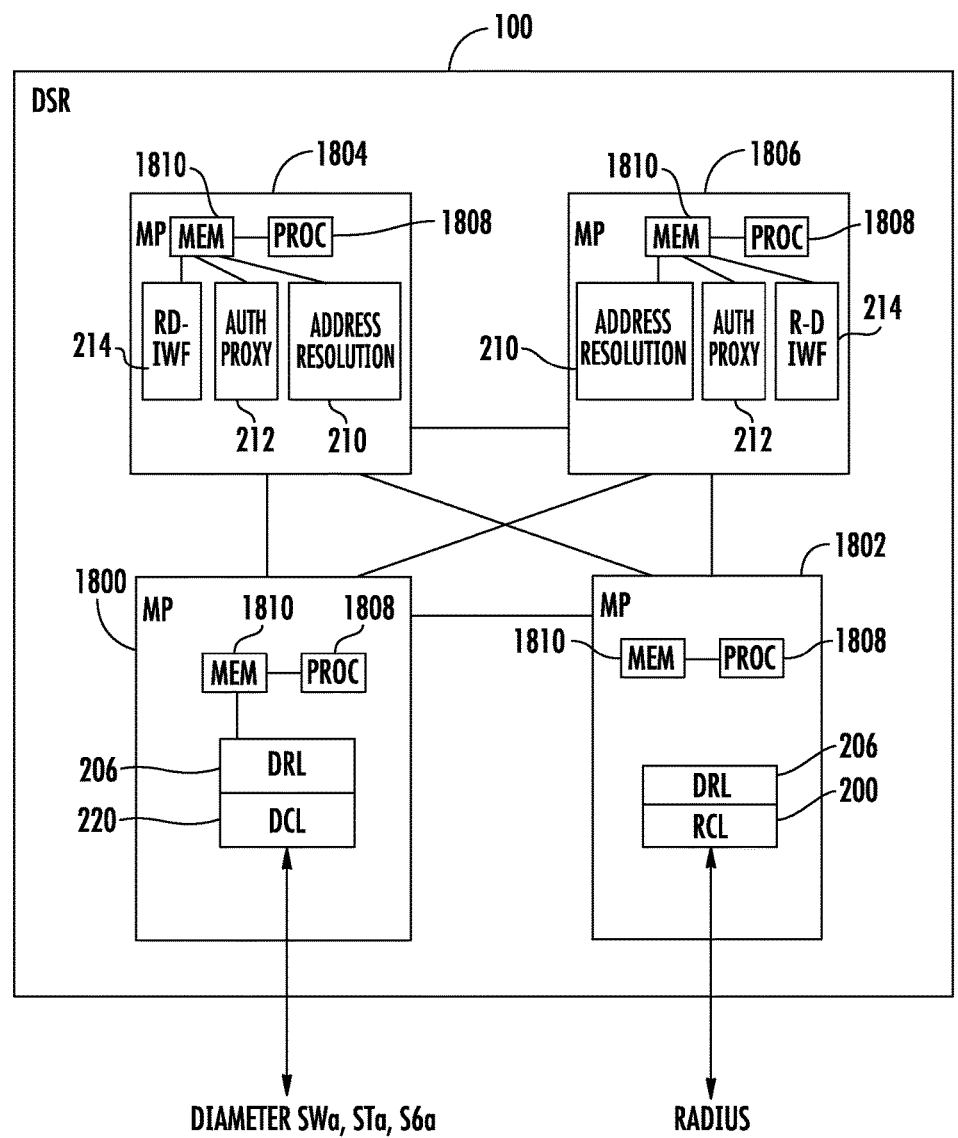
FIG. 18 is a block diagram of a DSR with an integrated RADIUS proxy that performs address resolution for RADIUS and Diameter messages according to an aspect of the subject matter described herein.

As stated above, access network protocol interworking as described herein may be implemented on a DSR. FIG. 18 is a block diagram illustrating an exemplary architecture for DSR that implements access network protocol interworking according to an aspect of the subject matter described herein. Referring to FIG. 18, DSR 100 includes a plurality of message processors 1800, 1802, 1804, and 1806 that perform various functions associated with Diameter routing, address resolution, and protocol interworking. Each message processor 1800, 1802, 1804, and 1806 may be implemented as a printed circuit board or blade that includes at least one processor 1808 and memory 1810. Message processors 1800, 1802, 1804, and 1806 may be connected to each other via a bus or other suitable internal connection. Each of message processors 1800, 1802, 1804, and 1806 may include a hypervisor (not shown) to virtualize access to underlying hardware resources so that the access network protocol interworking and other components described herein can operate in virtual machine environments.

In the illustrated example, message processor 1800 includes DCL 220 and DRL 206. DCL 220 performs functions for establishing Diameter connections with other nodes over Diameter interfaces, such as SWa and STa interfaces. DRL 206 routes messages based on Diameter level information in the messages.

Message processor 1802 includes RCL 200 that establishes and maintains RADIUS connections with other nodes. RCL 200 encapsulates received RADIUS messages in Diameter messages, as described above. Message processor 1802 also includes DRL 206 that routes Diameter messages based on Diameter level information. DRL 206, in one implementation, may also determine whether received messages require processing by R-D IWF 214, address resolution module 210, or authentication proxy 212.

Message processor 1804 includes address resolution module 210 that performs range based address resolution and individual subscriber identifier address resolution for RADIUS and Diameter messages. Such address resolution may include performing a lookup based on an IMSI or MSISDN number in a message to determine the appropriate destination for the message and (for Diameter messages) inserting the routing information in the messages for routing the messages to the appropriate destination. For RADIUS messages, the routing information determined by the address resolution may be inserted in the destination host parameter of the Diameter message that encapsulates the RADIUS message within DSR 100 and used for the Diameter route lookup. The encapsulating Diameter message may be removed prior to forwarding the RADIUS message to its destination. Message processor 1804 may also include authentication proxy 212 which performs the functions described above for authentication proxying for HLR and HSS authentication. Message processor 1804 may also include R-D IWF 214, which performs the protocol interworking functions described herein. For example, R-D IWF 214 may perform the access network protocol interworking described above with respect to FIG. 14 or FIG. 15. Message processor 1806 may be identically provisioned to message processor 1804 and may be provided for redundancy or load sharing purposes.

Thus, when a Diameter message arrives at message processor 1800, DRL 206 determines whether address resolution, signaling protocol interworking processing, and/or authentication proxying is required. If any of these applications is required, DRL 206 sends the message to one of message processors 1804 and 1806 for application processing. The applications on the receiving message processor perform required functions and formulate the outbound message. Address resolution may be performed to determine the routing information for the outbound message. Address resolution module 210 forwards the message to the appropriate message processor 1800 or 1802 which forwards the message to its intended next hop.

Accordingly, the architecture illustrated in FIG. 18 is a special purpose machine that performs address resolution, authentication proxying, and access network signaling protocol interworking for authenticating users on different types of access networks using plural different types of cellular network authentication interfaces. The architecture illustrated in FIG. 18 improves the functionality of both access and cellular networks by seamlessly authenticating user devices to those networks without requiring that the access network and the core cellular network use the same signaling protocol to carry authentication information.

In addition, because the authentication protocol is implemented end-to-end between the access network and the authenticating server in the cellular network, the signaling protocol interworking can be performed statelessly with respect to the authentication protocol. Stateless signaling protocol interworking may simplify the design and/or implementation of the protocol interworking function.

Further, because address resolution is performed by DSR 100 for inbound RADIUS or Diameter messages, messaging in the core network may be reduced over implementations requiring external database queries to resolve subscriber identifiers into routable addresses.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for remote authentication dial in user service (RADIUS) proxy or Diameter agent address resolution, the method comprising:
   in a network node including a plurality of message processors:
      receiving an inbound RADIUS message;
      determining that address resolution is required for the RADIUS message, wherein determining whether address resolution is required for the RADIUS message includes performing a lookup in an application routing table that maps a RADIUS message type of RADIUS Access Request requesting authentication challenge information to applications within the network node for processing the RADIUS message, wherein one of the applications mapped by the application routing table to the RADIUS message type of RADIUS Access Request is an address resolution application within the network node;
      in response to determining that address resolution is required for the RADIUS message, performing the address resolution using the address resolution application within the network node, wherein performing the address resolution includes mapping a non-routable identifier in the message to a routable address for a destination; and
      routing an outbound message to the destination using the routable address for the destination obtained from the address resolution application, wherein the outbound message comprises a RADIUS or Diameter message.

2. The method of claim 1 wherein receiving an inbound message includes receiving a RADIUS message requesting authentication challenge information and wherein routing the outbound message using the routable address for the destination obtained from the address resolution application includes routing a Diameter message to obtain the authentication challenge information.

3. The method of claim 1 wherein receiving an inbound message includes receiving a RADIUS message requesting authentication, authorization, and accounting (AAA) server authentication or accounting and wherein routing the outbound message includes routing the RADIUS message to an AAA server.

4. The method of claim 1 wherein receiving an inbound message includes receiving a RADIUS message requesting authentication, authorization, and accounting (AAA) server authentication and wherein routing the outbound message includes routing an outbound Diameter message to an AAA server corresponding to the address for the destination obtained from the address resolution application.

5. The method of claim 1 wherein performing the address resolution includes performing a lookup using an international mobile station identifier (IMSI), a mobile subscriber integrated services digital network (MSISDN) number, a subscriber Internet protocol (IP) address, or an IP multimedia subsystem (IMS) public or private identity in the inbound message.

6. The method of claim 1 wherein performing the address resolution includes performing range based address resolution.

7. The method of claim 1 wherein performing the address resolution includes performing address resolution based on full subscriber address.

8. The method of claim 1 wherein the network node comprises a Diameter signaling router functioning as a RADIUS proxy.

9. A system for remote authentication dial in user service (RADIUS) proxy or Diameter agent address resolution, the system comprising:
a network node including a plurality of hardware message processors;
the hardware message processors including a first hardware message processor for receiving an inbound RADIUS message and for determining that address resolution is required for the RADIUS message, wherein determining whether address resolution is required for the RADIUS message includes performing a lookup in an application routing table that maps a RADIUS message type of RADIUS Access Request requesting authentication challenge information to applications within the network node for processing the RADIUS message, wherein one of the applications mapped to the RADIUS message type is an address resolution application;
wherein the address resolution application, in response to a determination that address resolution is required for the RADIUS message, performs the address resolution and wherein performing the address resolution includes mapping a non-routable identifier in the message to a routable address for a destination; and
a routing layer for routing an outbound message to the destination using the routable address for the destination obtained from the address resolution, wherein the outbound message comprises a RADIUS or Diameter message.

10. The system of claim 9 wherein the inbound message comprises a RADIUS message requesting authentication information and wherein the outbound message comprises a Diameter message for obtaining the authentication challenge information.

11. The system of claim 9 wherein the inbound message includes a RADIUS message requesting authentication, authorization, and accounting (AAA) server authentication or accounting, wherein the outbound message comprises a RADIUS message and wherein the destination comprises an AAA server.

12. The system of claim 9 wherein the inbound message comprises a RADIUS message requesting authentication, authorization, and accounting (AAA) server authentication, the outbound message comprises a Diameter message, and the destination comprises an AAA server corresponding to the address identified by the address resolution application.

13. The system of claim 9 wherein the address resolution application is configured to perform an address resolution lookup using an international mobile station identifier (IMSI), a mobile subscriber integrated services digital network (MSISDN) number, a subscriber Internet protocol (IP) address, and an IP multimedia subsystem (IMS) public or private identity in the inbound message.

14. The system of claim 9 wherein the address resolution application is configured to perform range based address resolution.

15. The system of claim 9 wherein the address resolution application is configured to perform address resolution based on a full subscriber address.

16. The system of claim 9 wherein the network node comprises a Diameter signaling router functioning as a RADIUS proxy.

17. A non-transitory computer readable medium having stored thereon executable instructions that when executed by a processor of a computer control the computer to perform steps comprising:
in a network node including a plurality of message processors:
receiving an inbound remote authentication dial in user service (RADIUS) message;
determining that address resolution is required for the RADIUS, wherein determining whether address resolution is required for the RADIUS message includes performing a lookup in an application routing table that maps a RADIUS message type of RADIUS Access Request requesting authentication challenge information to applications within the network node for processing the RADIUS message, wherein one of the applications mapped to the RADIUS message type is an address resolution application within the network node;
in response to determining that address resolution is required for the RADIUS message, performing the address resolution using the address resolution application within the network node, wherein performing the address resolution includes mapping a non-routable identifier in the message to a routable address for a destination; and
routing an outbound message to a destination using the routable address for the destination obtained from the address resolution application, wherein the outbound message comprises a RADIUS or Diameter message.

* * * * *

UNITED STATES PATENT AND TRADEMARK OFFICE
CERTIFICATE OF CORRECTION

PATENT NO. : 10,084,755 B2
APPLICATION NO. : 14/929283
DATED : September 25, 2018
INVENTOR(S) : McCann Page 1 of 1

It is certified that error appears in the above-identified patent and that said Letters Patent is hereby corrected as shown below:

In the Specification

In Column 6, Line 64, delete "IF" and insert -- IP --, therefor.

In Column 6, Line 66, delete "pubic" and insert -- public --, therefor.

In Column 11, Line 55, delete "56a" and insert -- S6a --, therefor.

In Column 11, Line 58, delete "56a" and insert -- S6a --, therefor.

In Column 12, Line 2, delete "S6-a" and insert -- S6a --, therefor.

Signed and Sealed this
Seventh Day of January, 2020

Andrei Iancu
*Director of the United States Patent and Trademark Office*